(12) United States Patent
Valensa et al.

(10) Patent No.: US 8,241,801 B2
(45) Date of Patent: Aug. 14, 2012

(54) INTEGRATED SOLID OXIDE FUEL CELL AND FUEL PROCESSOR

(75) Inventors: Jeroen Valensa, Muskego, WI (US); Michael J. Reinke, Franklin, WI (US); Mark G. Voss, Franksville, WI (US)

(73) Assignee: Modine Manufacturing Company, Racine, WI (US)

( * ) Notice: Subject to any disclaimer, the term of this patent is extended or adjusted under 35 U.S.C. 154(b) by 1045 days.

(21) Appl. No.: 11/503,611

(22) Filed: Aug. 14, 2006

(65) Prior Publication Data
US 2008/0038600 A1 Feb. 14, 2008

(51) Int. Cl.
*H01M 8/06* (2006.01)

(52) U.S. Cl. ........ 429/423; 429/416; 429/434; 429/436; 429/440; 429/441

(58) Field of Classification Search .................. None
See application file for complete search history.

(56) References Cited

U.S. PATENT DOCUMENTS

| | | |
|---|---|---|
| 3,453,087 A | 7/1969 | Herp, Jr. et al. |
| 3,453,146 A | 7/1969 | Bawa et al. |
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,342,816 A | 8/1982 | Kothmann et al. |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |

(Continued)

FOREIGN PATENT DOCUMENTS

DE 19727841 1/1999

(Continued)

OTHER PUBLICATIONS

U.S. Appl. No. 11/503,699, filed Aug. 14, 2006, Valensa et al.

(Continued)

*Primary Examiner* — Ula C Ruddock
*Assistant Examiner* — Tony Chuo
(74) *Attorney, Agent, or Firm* — Michael Best & Friedrich LLP

(57) ABSTRACT

An integrated fuel cell unit (10) includes an annular array (12) of fuel cell stacks (14), an annular cathode recuperator (20), an annular anode recuperator (22), a reformer (24), and an anode exhaust cooler (26), all integrated within a common housing structure (28).

10 Claims, 24 Drawing Sheets

U.S. PATENT DOCUMENTS

| | | | |
|---|---|---|---|
| 4,473,517 A | | 9/1984 | Goedtke et al. |
| 4,473,622 A | | 9/1984 | Chludzinski et al. |
| 4,522,894 A | | 6/1985 | Hwang et al. |
| 4,532,192 A | | 7/1985 | Baker et al. |
| 4,539,267 A | | 9/1985 | Sederquist |
| 4,548,875 A | | 10/1985 | Lance et al. |
| 4,554,223 A | | 11/1985 | Yokoyama et al. |
| 4,567,117 A | | 1/1986 | Patel et al. |
| 4,647,516 A | | 3/1987 | Matsumura et al. |
| 4,654,207 A | | 3/1987 | Preston |
| 4,657,829 A | | 4/1987 | McElroy et al. |
| 4,670,359 A | | 6/1987 | Beshty et al. |
| 4,678,723 A | | 7/1987 | Wertheim |
| 4,696,871 A | | 9/1987 | Pinto |
| 4,702,973 A | | 10/1987 | Marianowski |
| 4,716,023 A | | 12/1987 | Christner et al. |
| 4,722,873 A | | 2/1988 | Matsumura |
| 4,728,584 A | | 3/1988 | Isenberg |
| 4,737,161 A | | 4/1988 | Szydlowski et al. |
| 4,792,502 A | | 12/1988 | Trocciola et al. |
| 4,808,491 A | | 2/1989 | Reichner |
| 4,810,472 A | | 3/1989 | Andrew et al. |
| 4,812,373 A | | 3/1989 | Grimble et al. |
| 4,820,314 A | | 4/1989 | Cohen et al. |
| 4,824,740 A | | 4/1989 | Abrams et al. |
| 4,828,940 A | | 5/1989 | Cohen et al. |
| 4,847,051 A | | 7/1989 | Parenti, Jr. |
| 4,865,926 A | | 9/1989 | Levy et al. |
| 4,898,792 A | | 2/1990 | Singh et al. |
| 4,917,971 A | | 4/1990 | Farooque |
| 4,933,242 A | | 6/1990 | Koga et al. |
| 4,983,471 A | | 1/1991 | Reichner et al. |
| 4,994,331 A | | 2/1991 | Cohen |
| 5,009,967 A | | 4/1991 | Scheffler |
| 5,034,287 A | | 7/1991 | Kunz |
| 5,039,579 A | | 8/1991 | Kinoshita |
| 5,047,299 A | | 9/1991 | Shockling |
| 5,077,148 A | | 12/1991 | Schora et al. |
| 5,079,105 A | | 1/1992 | Bossel |
| 5,082,751 A | | 1/1992 | Reichner |
| 5,082,752 A | | 1/1992 | Koga et al. |
| 5,084,362 A | | 1/1992 | Farooque |
| 5,084,363 A | | 1/1992 | Reiser |
| 5,091,075 A | | 2/1992 | O'Neill et al. |
| 5,100,743 A | | 3/1992 | Narita et al. |
| 5,143,800 A | | 9/1992 | George et al. |
| 5,169,730 A | | 12/1992 | Reichner et al. |
| 5,170,124 A | | 12/1992 | Blair et al. |
| 5,175,062 A | | 12/1992 | Farooque et al. |
| 5,187,024 A | | 2/1993 | Matsumura |
| 5,212,022 A | | 5/1993 | Takahashi et al. |
| 5,227,256 A | | 7/1993 | Marianowski et al. |
| 5,232,792 A | | 8/1993 | Reznikov |
| 5,246,791 A | | 9/1993 | Fisher et al. |
| 5,270,127 A | | 12/1993 | Koga et al. |
| 5,302,470 A | | 4/1994 | Okada et al. |
| 5,324,452 A | | 6/1994 | Allam et al. |
| 5,328,779 A | | 7/1994 | Tannenberger et al. |
| 5,340,664 A | | 8/1994 | Hartvigsen |
| 5,344,721 A | | 9/1994 | Sonai et al. |
| 5,346,779 A | | 9/1994 | Nakazawa |
| 5,348,814 A | | 9/1994 | Niikura et al. |
| 5,360,679 A | | 11/1994 | Buswell et al. |
| 5,366,819 A | | 11/1994 | Hartvigsen et al. |
| 5,441,821 A | | 8/1995 | Merritt et al. |
| 5,453,146 A | | 9/1995 | Kemper |
| 5,470,360 A | * | 11/1995 | Sederquist ................. 48/94 |
| 5,498,487 A | | 3/1996 | Ruka et al. |
| 5,501,914 A | | 3/1996 | Satake et al. |
| 5,505,824 A | | 4/1996 | McElroy |
| 5,516,344 A | | 5/1996 | Corrigan |
| 5,527,631 A | | 6/1996 | Singh et al. |
| 5,542,467 A | | 8/1996 | Carpentier |
| 5,573,867 A | | 11/1996 | Zafred et al. |
| 5,601,937 A | | 2/1997 | Isenberg |
| 5,641,585 A | | 6/1997 | Lessing et al. |
| 5,686,196 A | | 11/1997 | Singh et al. |
| 5,693,201 A | | 12/1997 | Hsu et al. |
| 5,730,213 A | * | 3/1998 | Kiser et al. ................. 165/148 |
| 5,733,675 A | | 3/1998 | Dederer et al. |
| 5,741,605 A | | 4/1998 | Gillett et al. |
| 5,763,114 A | | 6/1998 | Khandkar et al. |
| 5,914,200 A | | 6/1999 | Schabert et al. |
| 5,955,039 A | | 9/1999 | Dowdy |
| 6,013,385 A | | 1/2000 | DuBose |
| 6,051,125 A | | 4/2000 | Pham et al. |
| 6,106,967 A | | 8/2000 | Virkar et al. |
| 6,280,865 B1 | | 8/2001 | Eisman et al. |
| 6,329,090 B1 | | 12/2001 | McElroy et al. |
| 6,348,278 B1 | | 2/2002 | LaPierre et al. |
| 6,376,111 B1 | | 4/2002 | Mathias et al. |
| 6,383,670 B1 | | 5/2002 | Edlund et al. |
| 6,403,245 B1 | | 6/2002 | Hunt |
| 6,436,562 B1 | | 8/2002 | DuBose |
| 6,451,466 B1 | | 9/2002 | Grasso et al. |
| 6,531,243 B2 | | 3/2003 | Thom |
| 6,582,842 B1 | * | 6/2003 | King ................. 429/19 |
| 6,623,880 B1 | | 9/2003 | Geisbrecht et al. |
| 6,656,625 B1 | | 12/2003 | Thompson et al. |
| 6,749,958 B2 | | 6/2004 | Pastula et al. |
| 6,821,663 B2 | | 11/2004 | McElroy |
| 6,924,053 B2 | | 8/2005 | McElroy |
| 7,067,208 B2 | | 6/2006 | Gottmann et al. |
| 2001/0049035 A1 | | 12/2001 | Haltiner, Jr. et al. |
| 2002/0006535 A1 | | 1/2002 | Woods et al. |
| 2002/0028362 A1 | | 3/2002 | Prediger et al. |
| 2002/0058175 A1 | | 5/2002 | Ruhl |
| 2002/0106544 A1 | | 8/2002 | Noetzel et al. |
| 2002/0142208 A1 | | 10/2002 | Keefer et al. |
| 2002/0192516 A1 | | 12/2002 | Tajima |
| 2003/0031904 A1 | | 2/2003 | Haltiner |
| 2003/0049502 A1 | | 3/2003 | Dickman et al. |
| 2003/0157386 A1 | | 8/2003 | Gottmann |
| 2003/0162067 A1 | | 8/2003 | McElroy |
| 2003/0196893 A1 | | 10/2003 | McElroy |
| 2003/0205641 A1 | | 11/2003 | McElroy et al. |
| 2003/0235725 A1 | | 12/2003 | Haltiner et al. |
| 2003/0235733 A1 | * | 12/2003 | Haltiner et al. ................. 429/26 |
| 2004/0089438 A1 | | 5/2004 | Valensa et al. |
| 2004/0131912 A1 | | 7/2004 | Keefer et al. |
| 2004/0191597 A1 | | 9/2004 | McElroy |
| 2004/0191598 A1 | | 9/2004 | Gottmann |
| 2004/0202914 A1 | | 10/2004 | Sridhar et al. |
| 2004/0217732 A1 | | 11/2004 | Zhu et al. |
| 2004/0224193 A1 | | 11/2004 | Mitlitsky et al. |
| 2005/0026011 A1 | * | 2/2005 | Suzuki et al. ................. 429/19 |
| 2005/0048334 A1 | | 3/2005 | Sridhar et al. |
| 2005/0048336 A1 | | 3/2005 | Takebe et al. |
| 2005/0048338 A1 | | 3/2005 | Kobayashi et al. |
| 2005/0056412 A1 | | 3/2005 | Reinke et al. |
| 2005/0164051 A1 | | 7/2005 | Venkataraman et al. |
| 2005/0170235 A1 | | 8/2005 | Hu et al. |
| 2005/0178063 A1 | | 8/2005 | Reinke et al. |
| 2005/0249988 A1 | | 11/2005 | Pearson |
| 2006/0147771 A1 | | 7/2006 | Russell et al. |
| 2006/0204827 A1 | | 9/2006 | Hickey et al. |
| 2006/0248799 A1 | | 11/2006 | Bandhauer et al. |
| 2006/0251934 A1 | | 11/2006 | Valensa |
| 2006/0251939 A1 | | 11/2006 | Bandhauer et al. |
| 2006/0251940 A1 | | 11/2006 | Bandhauer et al. |
| 2007/0017369 A1 | | 1/2007 | LeVan et al. |
| 2007/0243435 A1 | | 10/2007 | Dutta |

FOREIGN PATENT DOCUMENTS

| | | |
|---|---|---|
| EP | 1262109 | 12/2002 |
| EP | 1 501 146 A2 | 1/2005 |
| GB | 432938 | 8/1935 |
| JP | 2000281311 | 10/2000 |
| WO | 87/04084 | 7/1987 |
| WO | WO 2004/013258 | 2/2004 |
| WO | WO 2004/092756 | 10/2004 |
| WO | WO 2004/093214 | 10/2004 |

OTHER PUBLICATIONS

U.S. Appl. No. 11/656,006, filed Jan. 22, 2007, Sridhar et al.

Austin, "Cell and Stack Construction: Low-Temperature Cells," *Fuel Cells: A Review of Government-Sponsored Research*, 1950-1964. NASA SP-120, pp. 101-102, (1967).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of 2002 U.S. DOE Hydrogen Program Review, NREL/CP-610-32405, pp. 1-14. (2002).

Mitlitsky, et al., "Regenerative Fuel Cells ter High Altitude Long Endurance Solar Powered Aircraft," Intersociety Energy Conversion Engineering Conference (IECEC). UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar. UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.). Advanced Technology Program ATP 2001 Competition, pp. 1-2, (Jun. 2002).

Anonymous, Presentation of the LabView-based software used in the Fuel Cell Technologies Testing System, Internet Article, Jul. 15, 2004, http://web.archive.org/web/20040715025135/fuelcelltechnologies.com/Support/Downloads/Tutorial.pdf.

Hamburger, R. O., et al., "LabView DSC Automales Fuel Cell Catalyst Research", Nov. 4, 2004, http://web.archive.org/web/20041104200039/http://bloomy.com/newsletters/fuelcellresearch.pdf.

Baehr, Hans Dieter and Stephan, Karl, Wärme-und Stoffübertragung, Springer Verlag Berlin Heidelberg, 1994, S. 2-5 and S. 43-45.

DE102006039157.8 Office Action dated Mar. 1, 2012 (with English translation), 19 pages.

\* cited by examiner

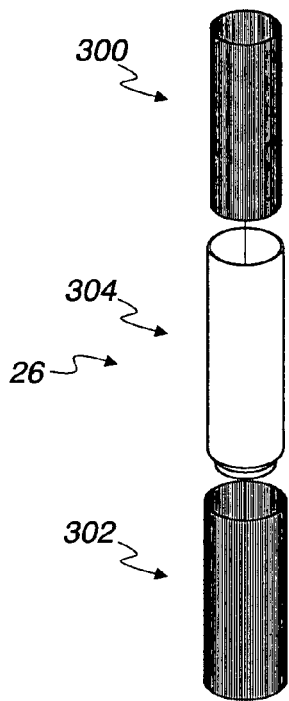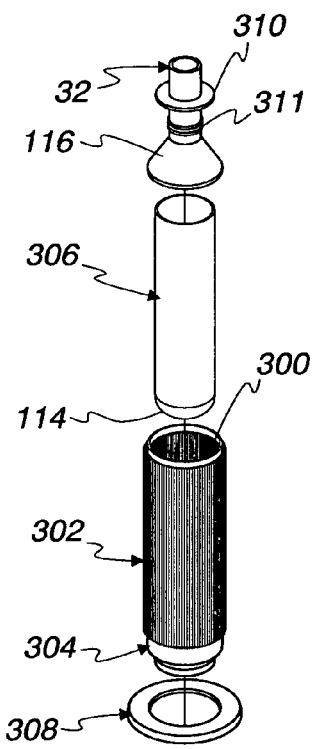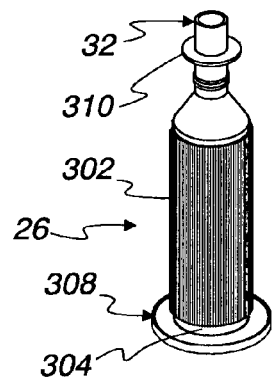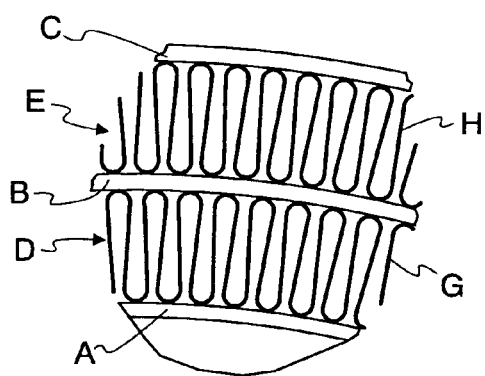

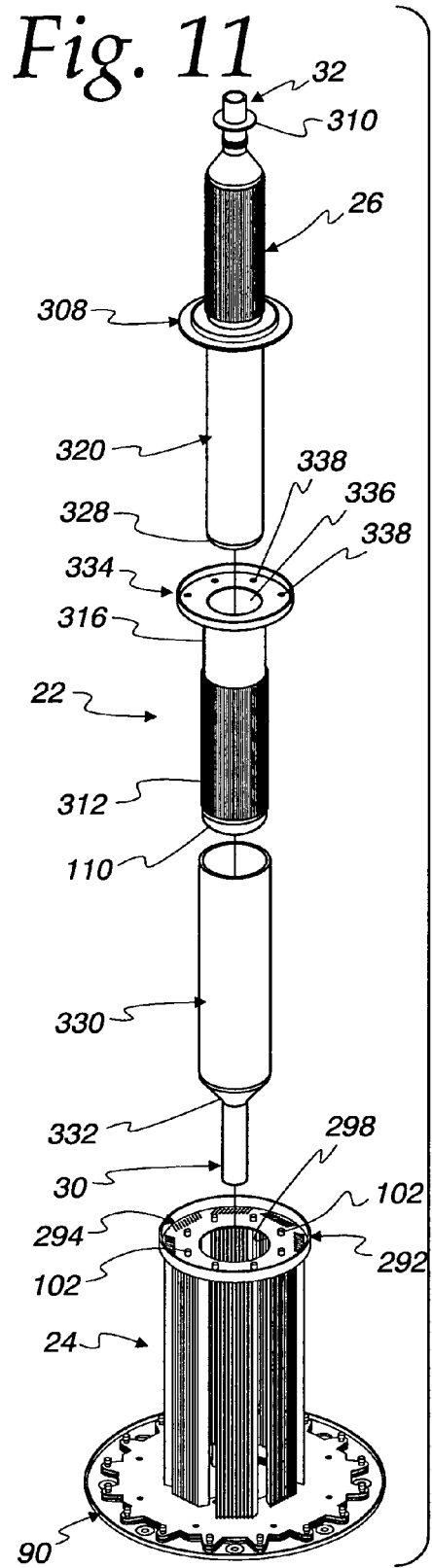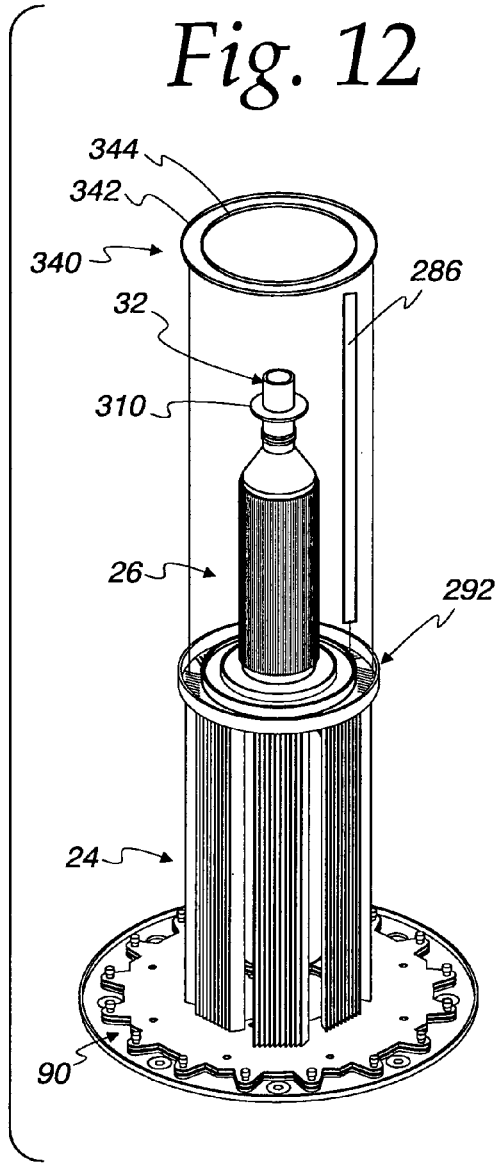

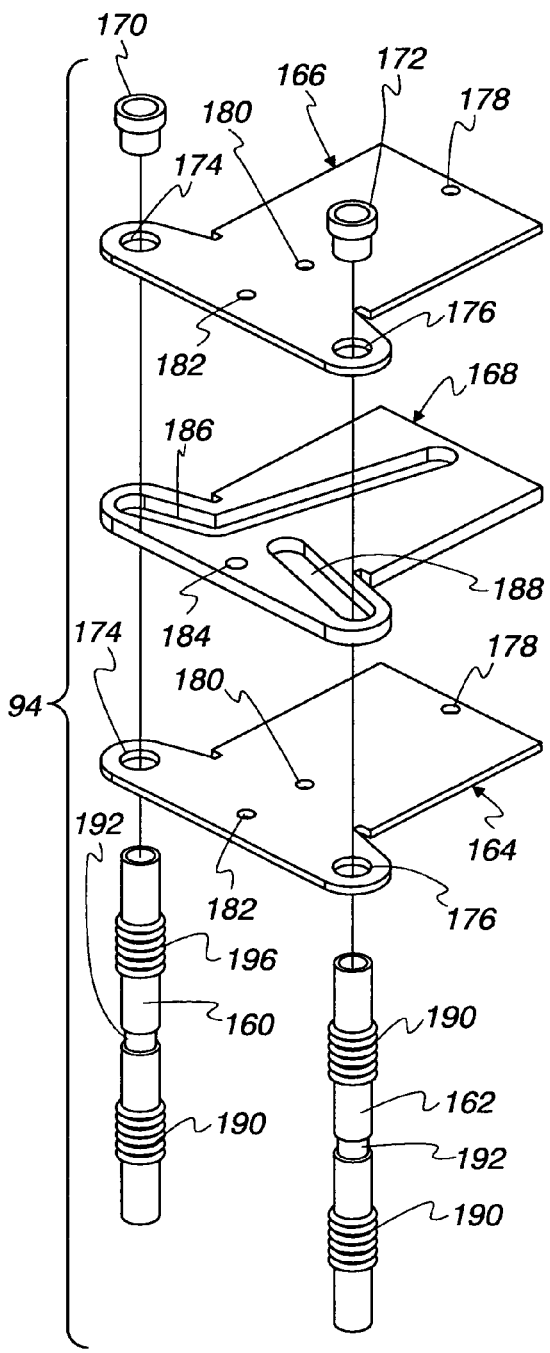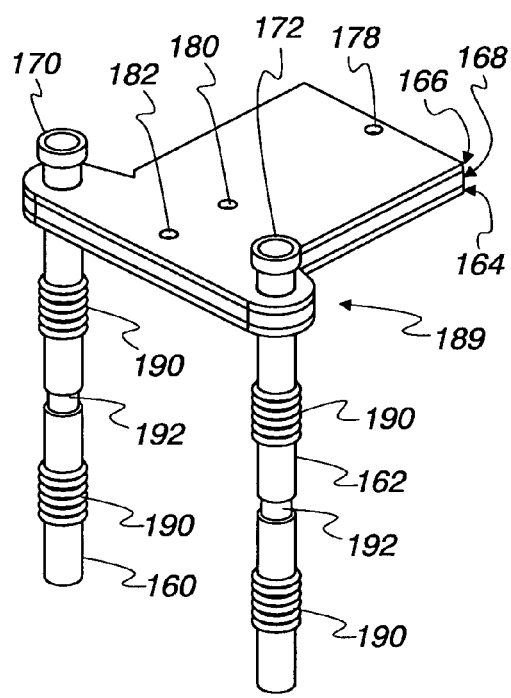

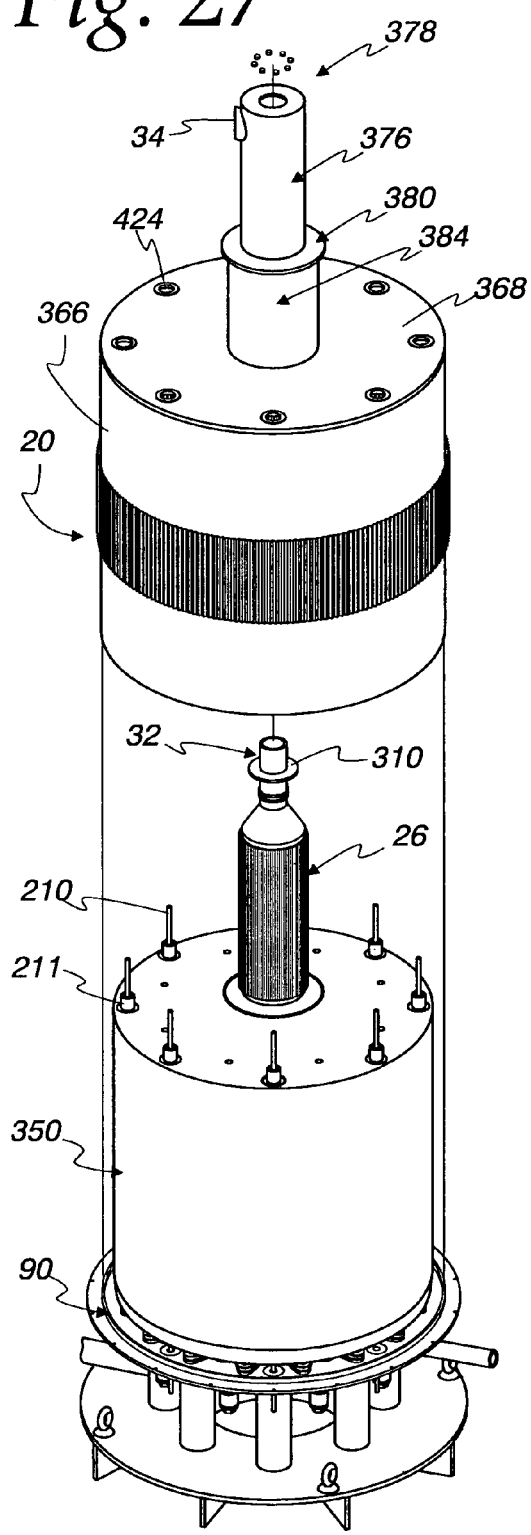
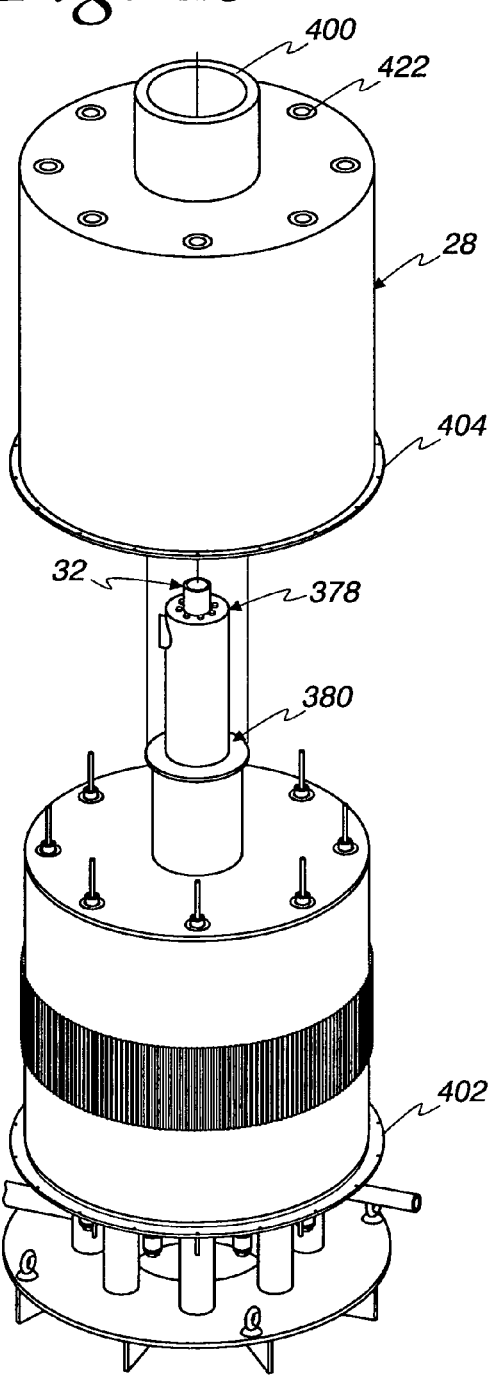

INTEGRATED SOLID OXIDE FUEL CELL AND FUEL PROCESSOR

FIELD OF THE INVENTION

This invention relates to solid oxide fuel cells and the fuel processing associated therewith.

BACKGROUND OF THE INVENTION

Solid oxide fuel cells ("SOFC's") and associated fuel processors are known. SOFC's are solid-state devices which use an oxygen ion conducting ceramic electrolyte to produce electrical current by transferring oxygen ions from an oxidizing gas stream at the cathode of the fuel cell to a reducing gas stream at the anode of the fuel cell. This type of fuel cell is seen as especially promising in the area of distributed stationary power generation. SOFC's require an operating temperature range which is the highest of any fuel cell technology, giving it several advantages over other types of fuel cells for these types of applications. The rate at which a fuel cell's electrochemical reactions proceed increases with increasing temperature, resulting in lower activation voltage losses for the SOFC. The SOFC's high operating temperature can preclude the need for precious metal catalysts, resulting in substantial material cost reductions. The elevated exit temperature of the flow streams allow for high overall system efficiencies in combined heat and power applications, which are well suited to distributed stationary power generation.

The traditional method of constructing solid oxide fuel cells has been as a large bundle of individual tubular fuel cells. Systems of several hundred kilowatts of power have been successfully constructed using this methodology. However, there are several known disadvantages to the tubular design which severely limit the practicality of its use in the area of 25 kW-100 kW distributed stationary power generation. For example, producing the tubes can require expensive fabrication methods, resulting in achievable costs per kW which are not competitive with currently available alternatives. As another example, the electrical interconnects between tubes can suffer from large ohmic losses, resulting in low volumetric power densities. These disadvantages to the tubular designs have led to the development of planar SOFC designs. The planar designs have been demonstrated to be capable of high volumetric power densities, and their capability of being mass produced using inexpensive fabrication techniques is promising.

As is known in the art, a single planar solid oxide fuel cell (SOFC) consists of a solid electrolyte which has high oxygen ion conductivity, such as yttria stabilized zirconia (YSZ); a cathode material such as strontium-doped lanthanum manganite on one side of the electrolyte, which is in contact with an oxidizing flow stream such as air; an anode material such as a cermet of nickel and YSZ on the opposing side of the electrolyte, which is in contact with a fuel flow stream containing hydrogen, carbon monoxide, a gaseous hydrocarbon, or a combination thereof such as a reformed hydrocarbon fuel; and an electrically conductive interconnect material on the other sides of the anode and cathode to provide the electrical connection between adjacent cells, and to provide flow paths for the reactant flow streams to contact the anode and cathode. Such cells can be produced by well-established production methodologies such as screen-printing and ceramic tape casting.

However, there are still challenges to implementing the planar SOFC for stationary power generation in the range of 25 kW-100 kW. The practical size of such cells is currently limited to a maximum footprint of approximately 10×10 cm by issues such as the thermal stresses within the plane of the cell during operation and the difficulties involved in fabricating very thin components. Since the achievable power density of the fuel cell is in the range of 180-260 mW/cm$^2$, a large number of cells must be assembled into one or more fuel cell stacks in order to achieve the required power levels for a stationary power generation application. Implementing large numbers of such cells presents several difficulties. A planar SOFC design requires high-temperature gas-tight seals around the edges of the cells, which typically requires large compressive loads on the stack. Anode and cathode flow-streams must be evenly distributed among the many cells. The heat generated by the fuel cell reaction must be able to be removed from the stack in order to prevent overheating. These issues and others have made it difficult for planar SOFC manufacturers to progress to fuel cell systems larger than about 5 kWe.

Thus, while the known systems may be suitable for their intended purpose, there is always room for improvement.

SUMMARY OF THE INVENTION

In accordance with one feature of the invention, a fuel cell system includes a radiant heat source having a heat radiating face, and a reformer. The reformer includes a row of reformer tubes to direct an anode inlet gas flow through the fuel cell system, with each of the tubes having a flattened cross section defined by a pair of spaced broad sides joined by a pair of spaced narrow sides. The tubes are arranged relative to the radiant heat source to ensure that radiant heat energy radiating normal to the radiating face from the radiant heat source cannot pass through the row of tubes without impinging on one of the broad sides of the tubes.

As one feature, the radiant heat source can include any of a fuel cell stack, an extended surface heated by a hot fluid, such as combusted anode exhaust gas, or a radiant burner or combustor.

In one feature, the reformer further includes a plurality of rows of reformer tubes, the rows of reformer tubes arranged to surround the radiant heat source.

According to one feature, the fuel cell system further includes a catalyst insert in each of the tubes.

As one feature, the fuel cell system further includes a second radiant heat source, and the row of reformer tubes is positioned between the radiant heat sources to receive radiant heat energy therefrom.

In accordance with one feature, a fuel cell system includes a fuel cell, and a reformer connected to the fuel cell to direct an anode inlet gas flow thereto and arranged adjacent to the fuel cell to receive radiant heat energy therefrom.

According to one feature, the reformer includes a plurality of flattened tubes to direct the anode inlet gas through the fuel cell system.

In a further feature, the tubes extend parallel to each other and are arranged in an annular array. In yet a further feature, the annular array is surrounded by the fuel cell.

As one feature, the fuel cell has a plurality of radiating faces and the tubes are arranged in a plurality of rows, with the tubes in each row arranged relative to one of the radiating faces of the fuel cell to ensure that radiant heat energy radiating normal to the radiating face from the fuel cell cannot pass through the row of tubes without impinging on one of the tubes.

In one feature, the fuel cell system further includes another radiant heat source, and the reformer is arranged between the fuel cell and the radiant heat source to receive radiant heat energy from both.

In accordance with one feature of the invention, a fuel cell system includes a fuel cell, an anode exhaust gas combustor connected to the fuel cell to receive anode exhaust gas therefrom, a combusted anode exhaust gas flow path connected to the anode exhaust gas combustor to receive combusted anode exhaust gas therefrom and including an extended surface heated by the combusted anode exhaust gas flow, and a reformer connected to the fuel cell to direct an anode inlet gas flow thereto and arranged adjacent the extended surface to receive radiant energy therefrom.

According to one feature, the reformer includes a plurality of flattened tubes to direct the anode inlet gas through the fuel cell system. In a further feature, the tubes extend parallel to each other and are arranged in an annular array. In yet a further feature, the annular array surrounds the extended surface.

In one feature, the tubes are arranged in a plurality of rows, with the tubes in each row arranged relative to the extended surface to ensure that radiant heat energy radiating normal to the extended surface cannot pass through the row of tubes without impinging on one of the tubes.

As one feature, the tubes are arranged relative to the extended surface to ensure that radiant heat energy radiating normal to the extended surface cannot pass through the row of tubes without impinging on one of the tubes.

According to one feature, the reformer is arranged adjacent the fuel cell to receive radiant heat energy therefrom. In a further feature, the fuel cell includes a plurality of fuel cell stacks arranged to surround the reformer. As yet a further feature, the reformer is arranged to surround the extended surface.

In accordance with one feature, the fuel cell system further includes a cathode recuperator heat exchanger connected to receive a hot gas flow including the combusted anode exhaust gas.

Other objects, features, and advantages of the invention will become apparent from a review of the entire specification, including the appended claims and drawings.

BRIEF DESCRIPTION OF THE DRAWINGS

FIG. 7 is a partial section view illustrating construction details common to several heat exchangers contained within the integrated unit of FIG. 1;

FIGS. 8 and 9 are exploded perspective views of the components of an anode exhaust cooler of the integrated unit of FIG. 1;

FIG. 10 is a perspective view showing the components of FIGS. 8 and 9 in their assembled state;

FIG. 11 is an exploded perspective view showing the assembled components of FIGS. 6 and 10 together with an anode recuperator of the integrated unit of FIG. 1;

FIG. 12 is an exploded perspective view showing the components of FIG. 11 together with a reformer catalyst insert and a cover ring component of the integrated unit of FIG. 1;

FIG. 13 is an enlarged, exploded perspective view of selected components utilized to distribute and collect anode flow to the fuel cell stacks of the integrated unit of FIG. 1;

FIG. 14 is a perspective view showing the assembled components of FIG. 13;

FIG. 27 is an exploded perspective view showing the assembled components of FIG. 26 together with the assembled components of FIG. 24;

FIG. 28 is an exploded perspective view showing the assembled components of FIG. 27 together with an outer housing of the integrated unit of FIG. 1;

DETAILED DESCRIPTION OF THE PREFERRED EMBODIMENTS

Figure 1:
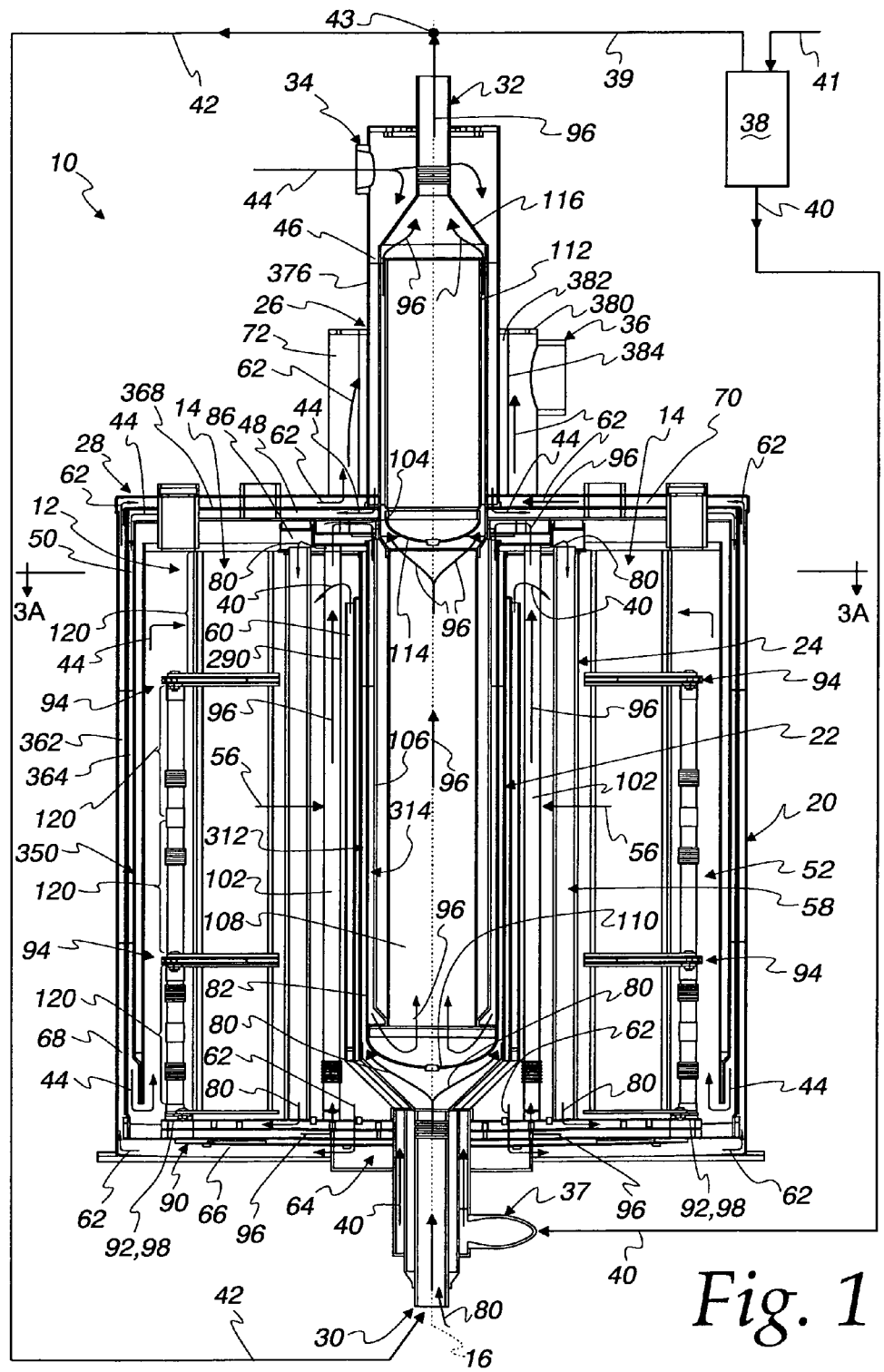
FIG. 1 is a sectional view of a fuel cell unit with an integrated SOFC and fuel processor embodying the present invention.
Figure 2A:
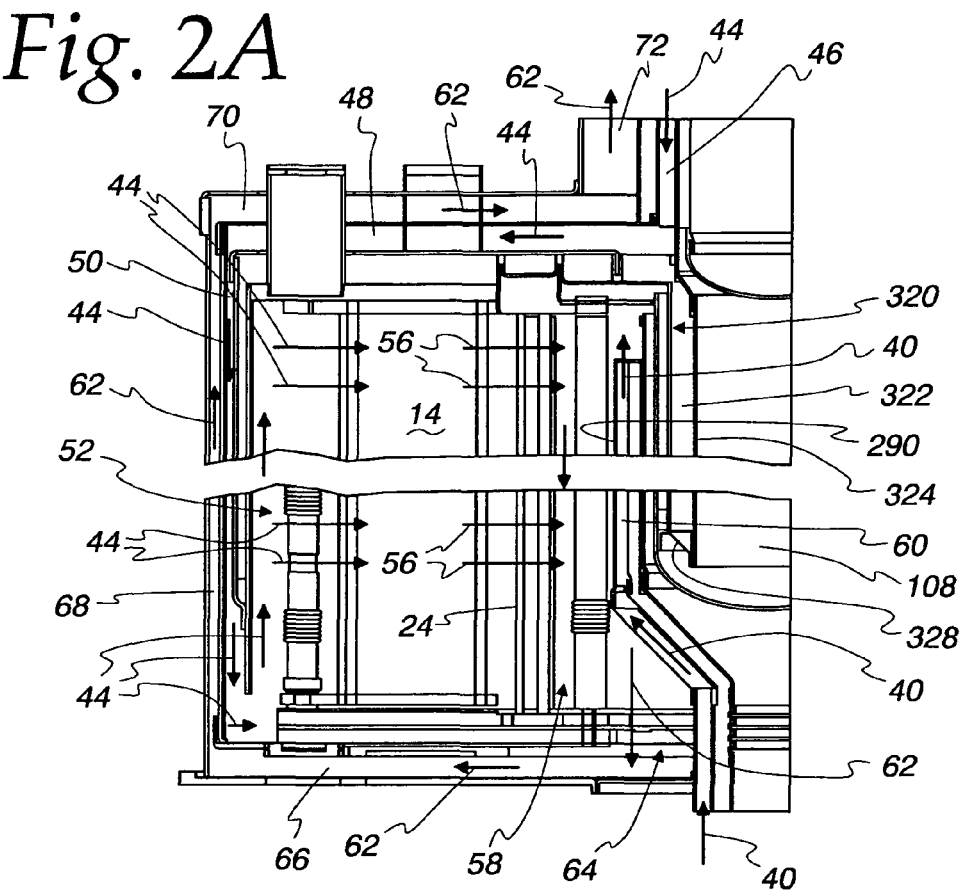
FIGS. 2A and 2B are sectional views showing one half of the fuel cell unit of FIG. 1, with FIG. 2A illustrating the flows of the cathode feed and exhaust gases and FIG. 2B illustrating the flows of the anode feed and exhaust gases.
Figure 2B:
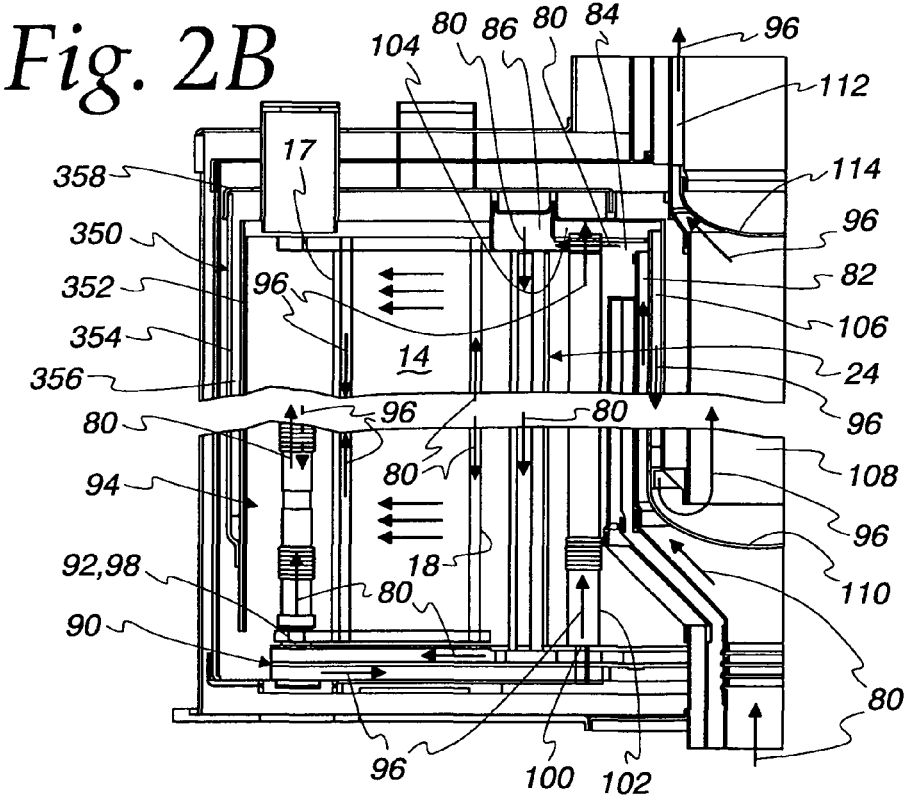
Figure 3A:
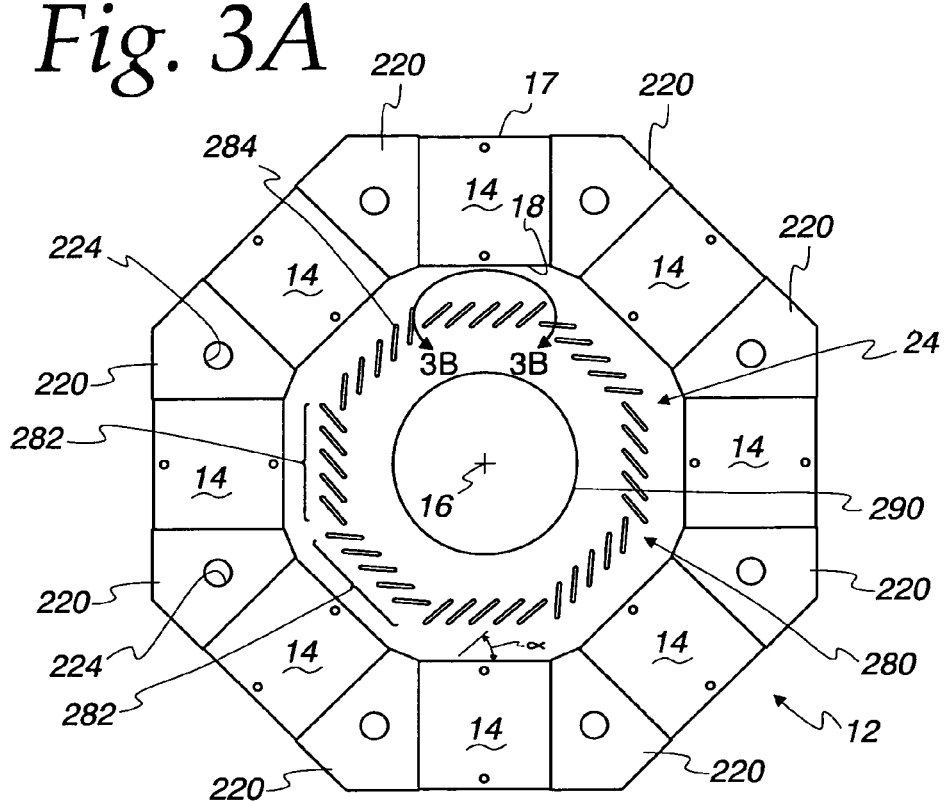
FIG. 3A is a sectional view taken from line 3A-3A in FIG. 1, but showing only selected components of the fuel cell unit.

With reference to FIGS. 1, 2A, 2B and 3A, an integrated fuel cell unit 10 is shown in form of an integrated solid oxide fuel cell ("SOFC")/fuel processor 10 having a generally cylindrical construction. The unit 10 includes an annular array 12 of eight (8) fuel cell stacks 14 surrounding a central axis 16, with each of the fuel cell stacks 14 having a stacking direction extended parallel to the central axis 16, with each of the stacks having a face 17 that faces radially outward and a face 18 that faces radially inward. As best seen in FIG. 3A the fuel cell stacks 14 are spaced angularly from each other and arranged to form a ring-shaped structure about the axis 16. Because there are eight of the fuel cell stacks 14, the annular array 12 could also be characterized as forming an octagon-shaped structure about the axis 16. While eight of the fuel cell stacks 14 have been shown, it should be understood that the invention contemplates an annular array 12 that may include more than or less than eight fuel cell stacks.

With reference to FIG. 1, the unit 10 further includes an annular cathode recuperator 20 located radially outboard from the array 12 of fuel stacks 14, an annular anode recuperator 22 located radially inboard from the annular array 12, a reformer 24 also located radially inboard of the annular array 12, and an annular anode exhaust cooler/cathode preheater 26, all integrated within a single housing structure 28. The housing structure 28 includes an anode feed port 30, an anode exhaust port 32, a cathode feed port 34, a cathode exhaust port 36, and an anode combustion gas inlet port 37. An anode exhaust combustor (typically in the form an anode tail gas oxidizer (ATO) combustor), shown schematically at 38, is a component separate from the integrated unit 10 and receives an anode exhaust flow 39 from the port 32 to produce an anode combustion gas flow 40 that is delivered to the anode combustion gas inlet 37. During startup, the combustor 38 also receives a fuel flow (typically natural gas), shown schematically by arrow 41. Additionally, some of the anode exhaust flow may be recycled to the anode feed port 30, as shown by arrows 42. In this regard, a suitable valve 43 may be provided to selectively control the routing of the anode exhaust flow to either the combustor 38 or the anode feed port 30. Furthermore, although not shown, a blower may be required in order to provide adequate pressurization of the recycled anode exhaust flow 42. While FIGS. 1, 2A and 2B are section views, it will be seen in the later figures that the components and features of the integrated unit 10 are symmetrical about the axis 16, with the exception of the ports 34, 36 and 37.

With reference to FIG. 1 and FIG. 2A, the cathode flows will be explained in greater detail. As seen in FIG. 1, a cathode feed (typically air), shown schematically by arrows 44, enters the unit 10 via the port 34 and passes through an annular passage 46 before entering a radial passage 48. It should be noted that as used herein, the term "radial passage" is intended to refer to a passage wherein a flow is directed either radially inward or radially outward in a generally symmetric 360° pattern. The cathode feed 44 flows radially outward through the passage 48 to an annular passage 50 that surrounds the array 12 and passes through the cathode recuperator 20. The cathode feed 44 flows downward through the annular passage 50 and then flows radially inward to an annular feed manifold volume 52 that surrounds the annular array 12 to distribute the cathode feed 44 into each of the fuel cell stacks 14 where the cathode feed provides oxygen ions for the reaction in the fuel cell stacks 14 and exits the fuel cell stacks 14 as a cathode exhaust 56. The cathode exhaust 56 then flows across the reformer 24 into an annular exhaust manifold area 58 where it mixes with the combustion gas flow 40 which is directed into the manifold 58 via an annular passage 60. In this regard, it should be noted that the combustion gas flow 40 helps to make up for the loss of mass in the cathode exhaust flow 56 resulting from the transport of oxygen in the fuel cell stacks 14. This additional mass flow provided by the combustion gas flow 40 helps in minimizing the size of the cathode recuperator 20. The combined combustion gas flow 40 and cathode exhaust 56, shown schematically by arrows 62, exits the manifold 58 via a central opening 64 to a radial passage 66. The combined exhaust 62 flows radially outward through the passage 66 to an annular exhaust flow passage 68 that passes through the cathode recuperator 20 in heat exchange relation with the passage 50 to transfer heat from the combined exhaust 62 to the cathode feed 44. The combined exhaust 62 flows upward through the annular passage 68 to a radial passage 70 which directs the combined exhaust 62 radially inward to a final annular passage 72 before exiting the unit 10 via the exhaust port 36.

With reference to FIG. 1 and FIG. 2B, an anode feed, shown schematically by arrows 80, enters the unit 10 via the anode feed inlet port 30 preferably in the form of a mixture of recycled anode exhaust 42 and methane. The anode feed 80 is directed to an annular passage 82 that passes through the anode recuperator 22. The anode feed 80 then flows to a radial flow passage 84 where anode feed 80 flows radially outward to an annular manifold or plenum 86 that directs the anode feed into the reformer 24. After being reformed in the reformer 24, the anode feed 80 exits the bottom of reformer 24 as a reformate and is directed into an integrated pressure plate/anode feed manifold 90. The feed manifold 90 directs the anode feed 80 to a plurality of stack feed ports 92, with one of the ports 92 being associated with each of the fuel cell stacks 14. Each of the ports 92 directs the anode feed 80 into a corresponding anode feed/return assembly 94 that directs the anode feed 82 into the corresponding fuel cell stack 14 and collects an anode exhaust, shown schematically by arrows 96, from the corresponding stack 14 after the anode feed reacts in the stack 14. Each of the anode feed/return assemblies 94 directs the anode exhaust 96 back into a corresponding one of a plurality of stack ports 98 in the pressure plate/manifold 90 (again, one port 98 for each of the fuel cell stacks 14). The manifold 90 directs the anode exhaust 96 radially inward to eight anode exhaust ports 100 (again, one for each stack 14) that are formed in the pressure plate/manifold 90. The anode exhaust 96 flows through the ports 100 into a plurality of corresponding anode exhaust tubes 102 which direct the anode exhaust 96 to a radial anode exhaust flow passage 104. The anode exhaust 96 flows radially inward through the passage 104 to an annular flow passage 106 that passes downward through the anode recuperator 22 in heat exchange relation with the flow passage 82. The anode exhaust 96 is then directed from the annular passage 106 upward into a tubular passage 108 by a baffle/cover 110 which is preferably dome-shaped. The anode exhaust 96 flows upwards through the passage 108 before being directed into another annular passage 112 by a baffle/cover 114, which again is preferably dome-shaped. The annular passage 112 passes through the anode cooler 26 in heat exchange relation with the annular cathode feed passage 46. After transferring heat to the cathode feed 44, the anode exhaust 96 exits the annular passage 112 and is directed by a baffle 116, which is preferably cone-shaped, into the anode exhaust port 32.

Having described the primary components of the unit 10 and the flow paths for the cathode and anode flows, the details of each of the components will now be discussed. In this regard, while the discussion will often refer to the figures out of numerical order, the numerical order of most of the figures was selected to reflect the assembly sequence of the unit 10.

Figure 4A:
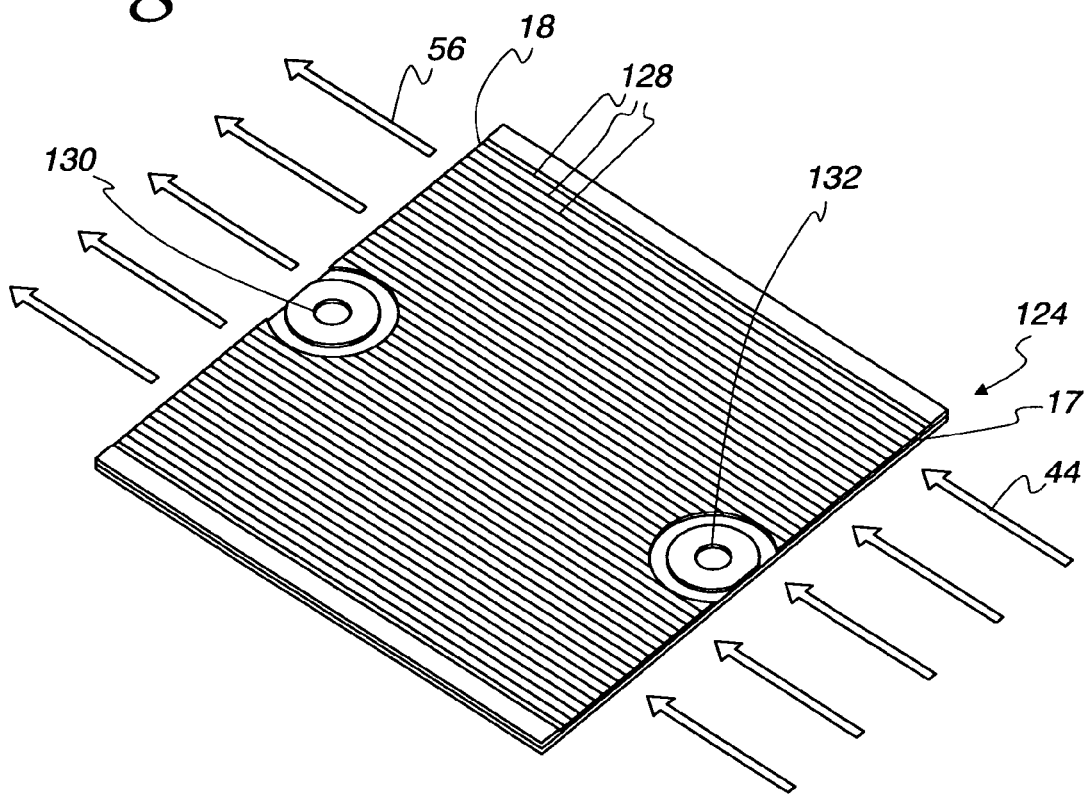
FIG. 4A is an enlarged, perspective view of a cathode flow side of a fuel cell plate/interconnect for use in the unit of FIG. 1.
Figure 4B:
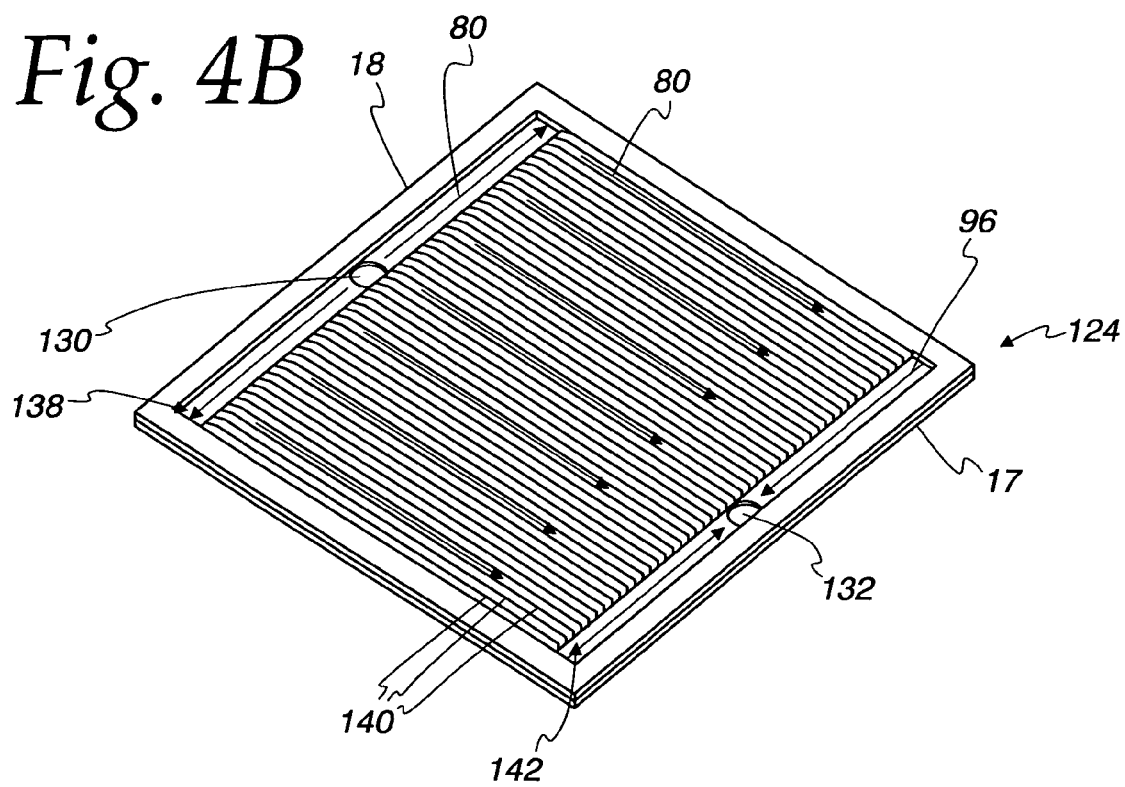
FIG. 4B is a view similar to FIG. 4A, showing the opposite side of the fuel cell plate/interconnect, which is the anode flow side.

Turning now in greater detail to the construction of the array 12 of fuel cell stacks 14, as best seen in FIGS. 1 and 15-19 in the illustrated embodiment, each stack 14 includes four substacks 120 with each of the substacks 120 including multiple individual planar SOFC cells 122, shown schematically in FIGS. 1 and 15-19, which are stacked so that they are in electrical series. The number of cells required for each substack 120 will be dependent upon the ability to distribute the anode flow with enough uniformity for satisfactory performance but may typically be between fifty (50) and one hundred (100) cells 122. For each of the cells 122, the structure of the electrolyte, anode, cathode, interconnects, and seal can be fabricated by any suitable method, many of which are known in the art of planar solid oxide fuel cells. As examples, the cell components can be electrolyte supported or anode supported, they can be fabricated by ceramic tape casting or other well-known means of construction, and the seals between the cells can be the glass ceramic or metallic type. In the illustrated embodiment, the anode sides of the cells 122 are internally manifolded within each substack 120, while the cathode sides are externally manifolded via the manifolds 52 and 58 as previously discussed. FIGS. 4A and 4B show possible designs for a flow plate/interconnect 124, with FIG. 4A showing cathode flow paths on one side and FIG. 4B showing the anode flow paths on the opposite side to direct the cathode and anode flow streams in a counter-flow manner. It can be seen that the cathode side includes a plurality of parallel, linear flow paths 128 that are open to either face 17,18 of the fuel cell 122 to allow passage of the cathode feed 44 through the fuel cell 122. The plate 124 also includes openings 130 and 132 that are surrounded by bosses on the cathode side which can be sealed in order to form the internal manifolding for the anode feed and exhaust flows 80 and 96. On the anode side, the openings 130 and 132 allow for entry and exit of the anode feed and exhaust flows 80 and 96, respectively, with the opening 130 feeding a linear plenum 138 that directs the anode feed flow to a plurality of parallel, linear flow paths 140, and a linear plenum 142 that directs the anode exhaust flow 96 to the opening 132. A single solid oxide fuel cell consisting of a cathode layer, a ceramic electrolyte layer, and an anode layer is sandwiched between each adjacent pair of the cathode flow paths 128 and the anode flow paths 140 in each of the stacks 14, and an electric current is produced by transferring oxygen ions from the cathode flow 44 through the ceramic electrolyte layer to the anode feed flow 80 according to the following reactions:

Cathode: $O_2 + 4e^- \rightarrow 2O^{2-}$

Anode: $H_2 + O^{2-} \rightarrow H_2O + 2e^-$ $CO + O^{2-} \rightarrow CO_2 + 2e^-$ With reference to FIGS. 13 and 14, each of the feed/return assemblies 94 includes an anode feed tube 160, an anode exhaust tube 162, a pair of cover plates 164 and 166, an intermediate plate 168, and a pair of fluid connections 170 and 172. In the illustrated embodiment, the plates 164 and 166 are identical and each plate 164 and 166 includes a feed port 174, an exhaust port 176, a feed opening 178, an exhaust opening 180, and a clearance hole 182. The intermediate plate 168 includes a clearance hole 184, a feed slot 186 and an exhaust slot 188. In the assembled state, the plates 164-168 form a splitter manifold 189 and the feed slot 186 directs the anode feed 80 from the ports 174 to the openings 178 for delivery to the substacks 120 positioned above and below the manifold 189, while the exhaust slot 188 directs anode exhaust 96 from the exhaust openings 180 to the ports 176 after receiving the anode exhaust from the substacks 120 positioned above and below the manifold 89. The fluid connections 170 and 172 either serve to connect the manifold assembly 94 to the tubes 160 and 162 of the next anode splitter assembly or, for the topmost splitter assembly, are provided in the form of end caps that close the ports 174 and 176. As will be explained in more detail below, the clearance holes 182 and 184 provide clearance for a bolt that is used to maintain alignment between the substacks 120 adjacent the splitter manifold 189.

Figure 20:
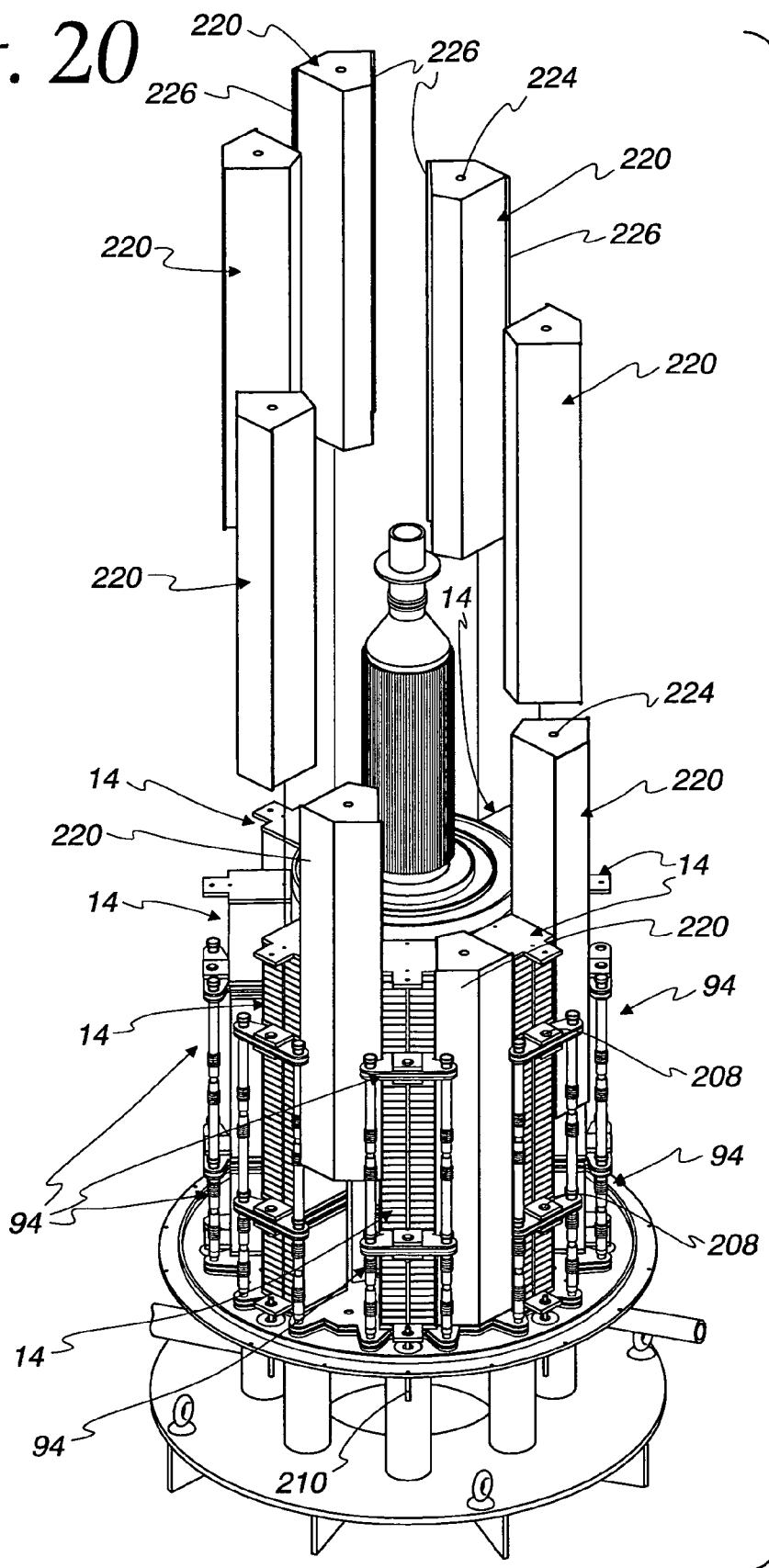
FIG. 20 is an exploded perspective view showing the components of FIG. 19 in their assembled state together with a plurality of spacer/baffles.

With reference to FIGS. 1 and 20, it can be seen that for each stack 14, the lowermost assemblies 94 service the two lower substacks 120, while the uppermost assemblies 94 service the two upper substacks 120.

With reference to FIGS. 13 and 14, preferably, each of the tubes 160 and 162 includes a pair of metallic tubes/bellows 190 to accommodate thermal expansion of the corresponding stack 14. Each pair of tubes/bellows 190 is connected by a tube-shaped electrical isolator 192 made of a suitable material that can be bonded (such as by brazing or by epoxy) to the tubes/bellows 190. The electrical isolators 192 provide electrical isolation of the manifold 189 from the manifold 90 and other manifolds 189.

With reference to FIGS. 15-19, it can be seen that the lowermost substack 120, the combination of the two intermediate substacks 120, and the uppermost substack 120 are each sandwiched between a pair of current collector plates 200, with each of the plates 200 including a tab 202 having a bolt opening 203 therein, an anode feed opening 204 that aligns with the corresponding feed opening 178 in the corresponding manifold 189 for transferring the anode feed 82 from the manifold 189 and to the corresponding substack 120, and an anode exhaust opening 206 that aligns with the corresponding exhaust opening 180 of the corresponding manifold 89 to direct the anode exhaust 96 from the corresponding substack 120 into the manifold 89. As best seen in FIGS. 13 and 17-19, bolts 208 are used to align and sandwich the current collector plates 200 on either side of a corresponding assembly 94 by passing the bolt 208 through the openings 182, 184 and 203 of the corresponding plates 164, 166, 168 and 200 and clamping the bolt with a corresponding washer and nut (not shown).

Figure 15:
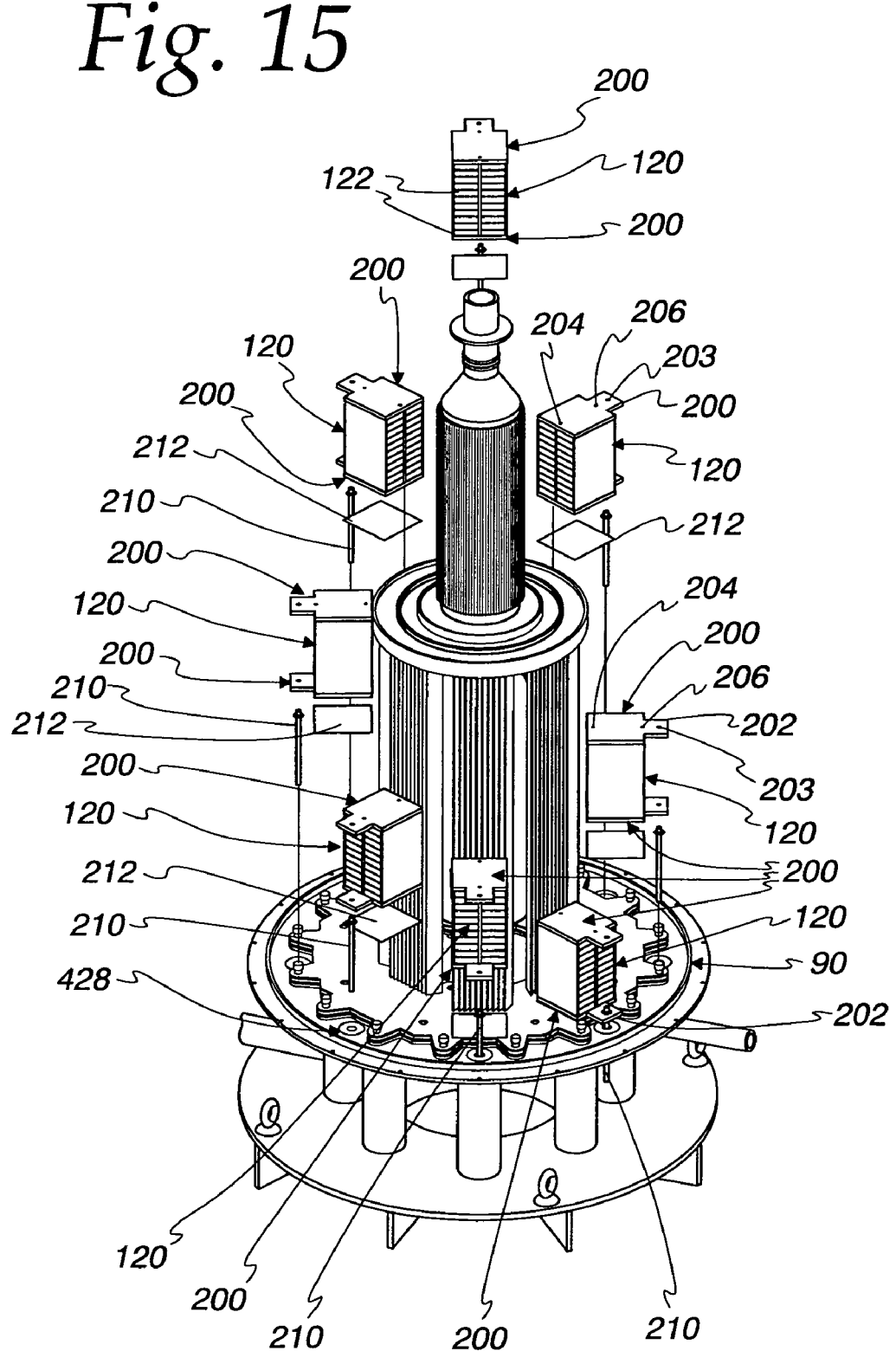
FIG. 15 is an exploded perspective view showing the assembled unit of FIG. 12 together with an annular array of fuel cell stacks of the integrated unit of FIG. 1.
Figure 16:
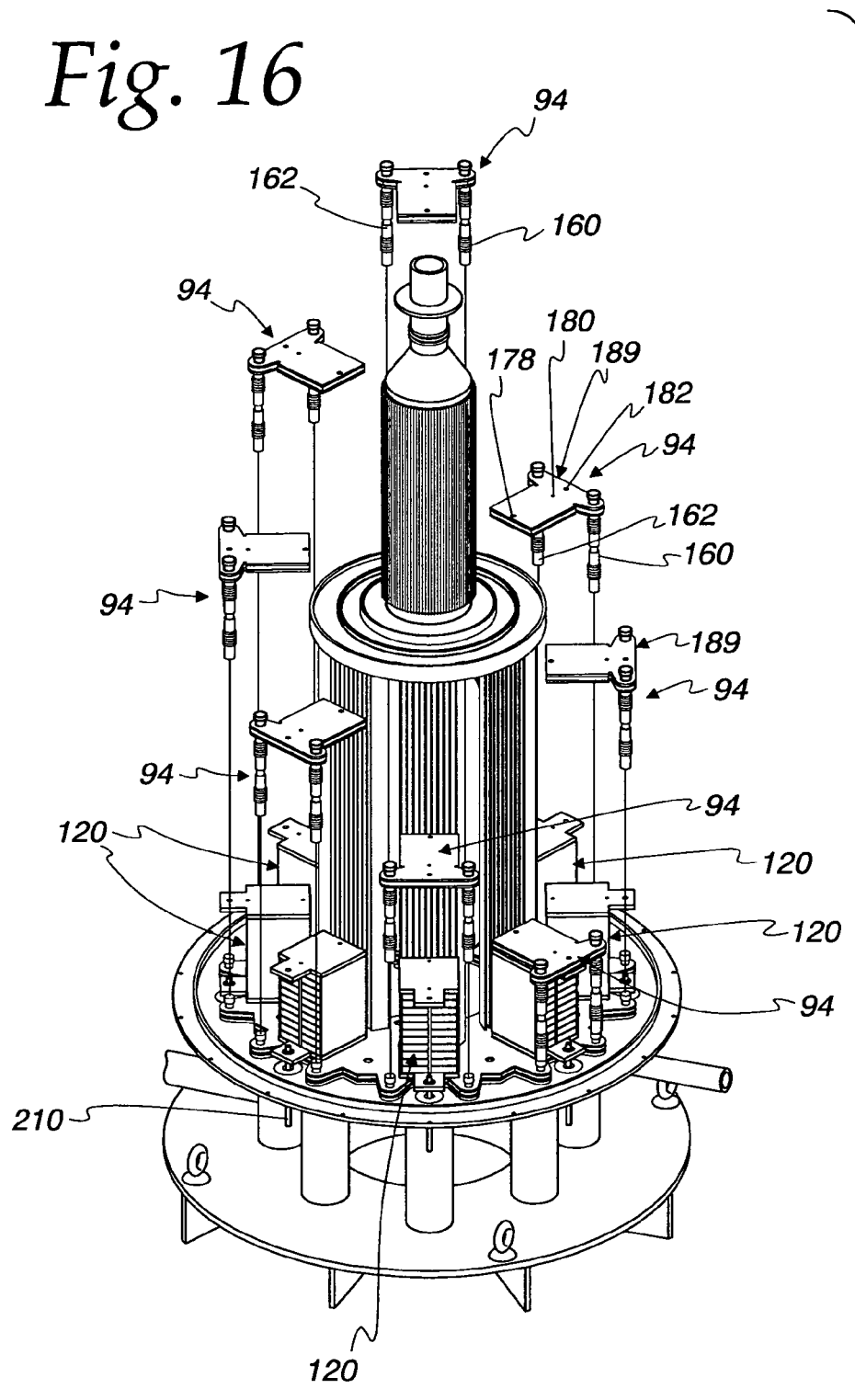
FIGS. 16-19 are views similar to FIG. 14 with each showing additional components of the array of fuel cell stacks as they are assembled.
Figure 17:
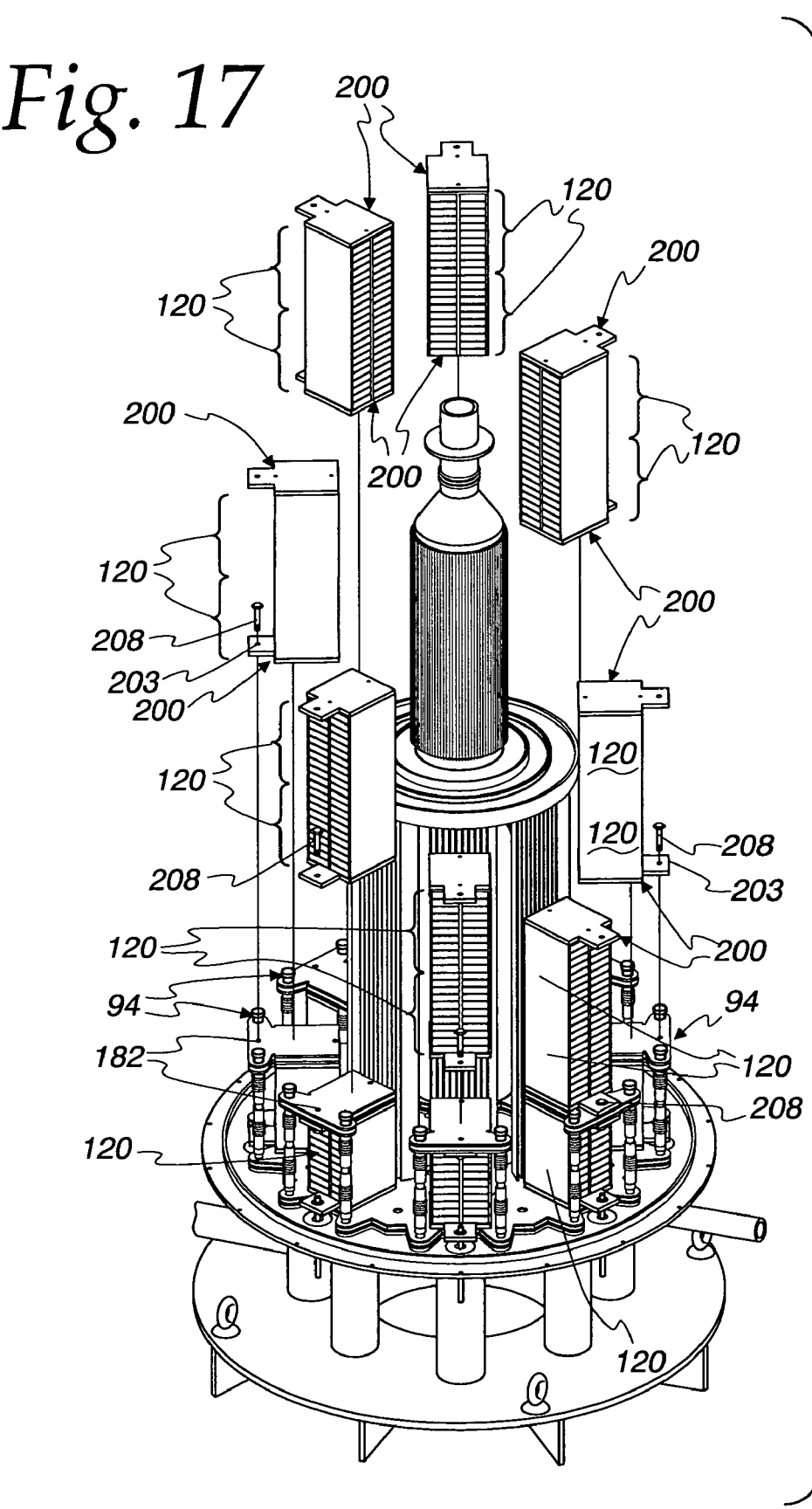
Figure 18:
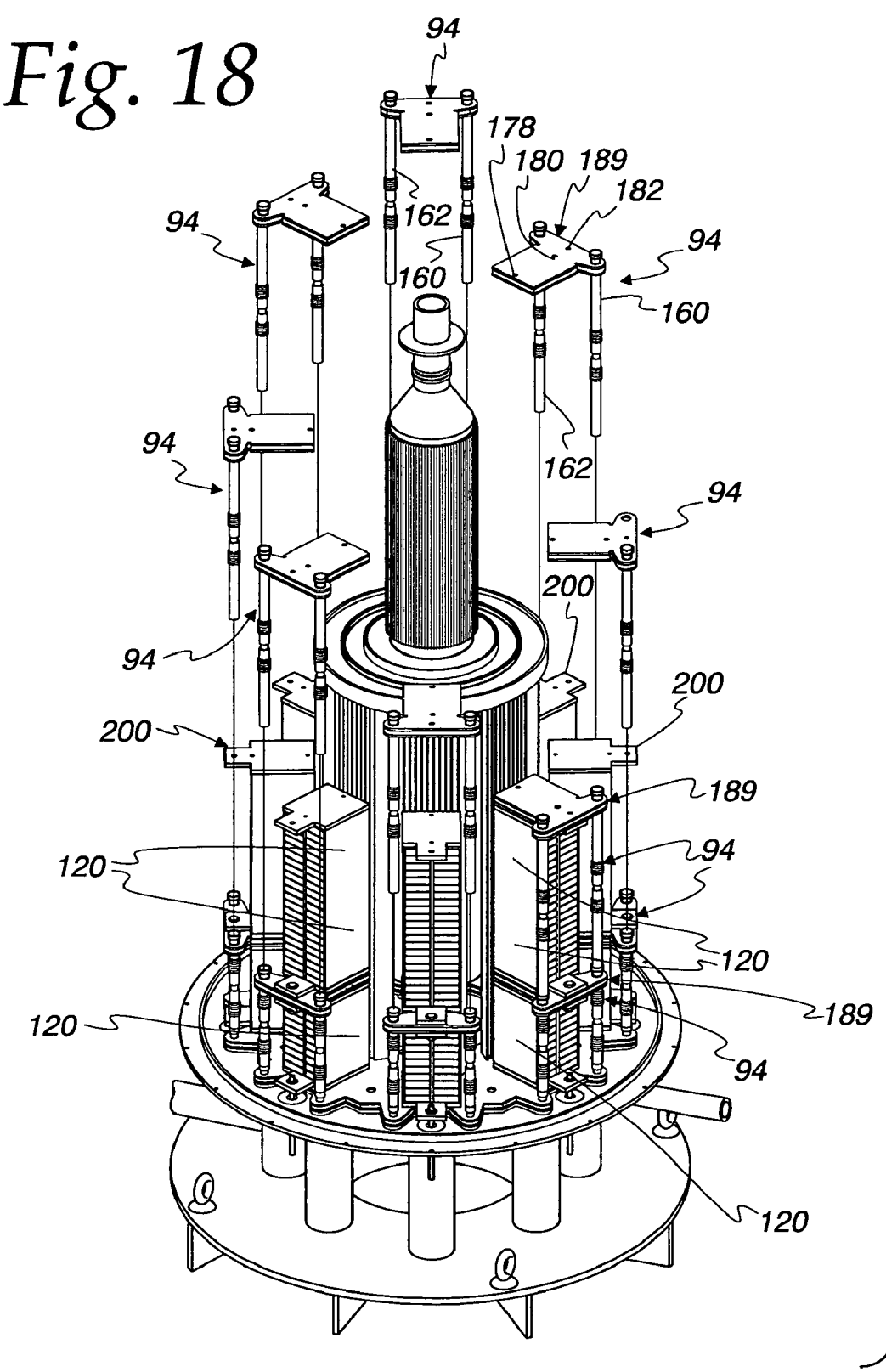
Figure 19:
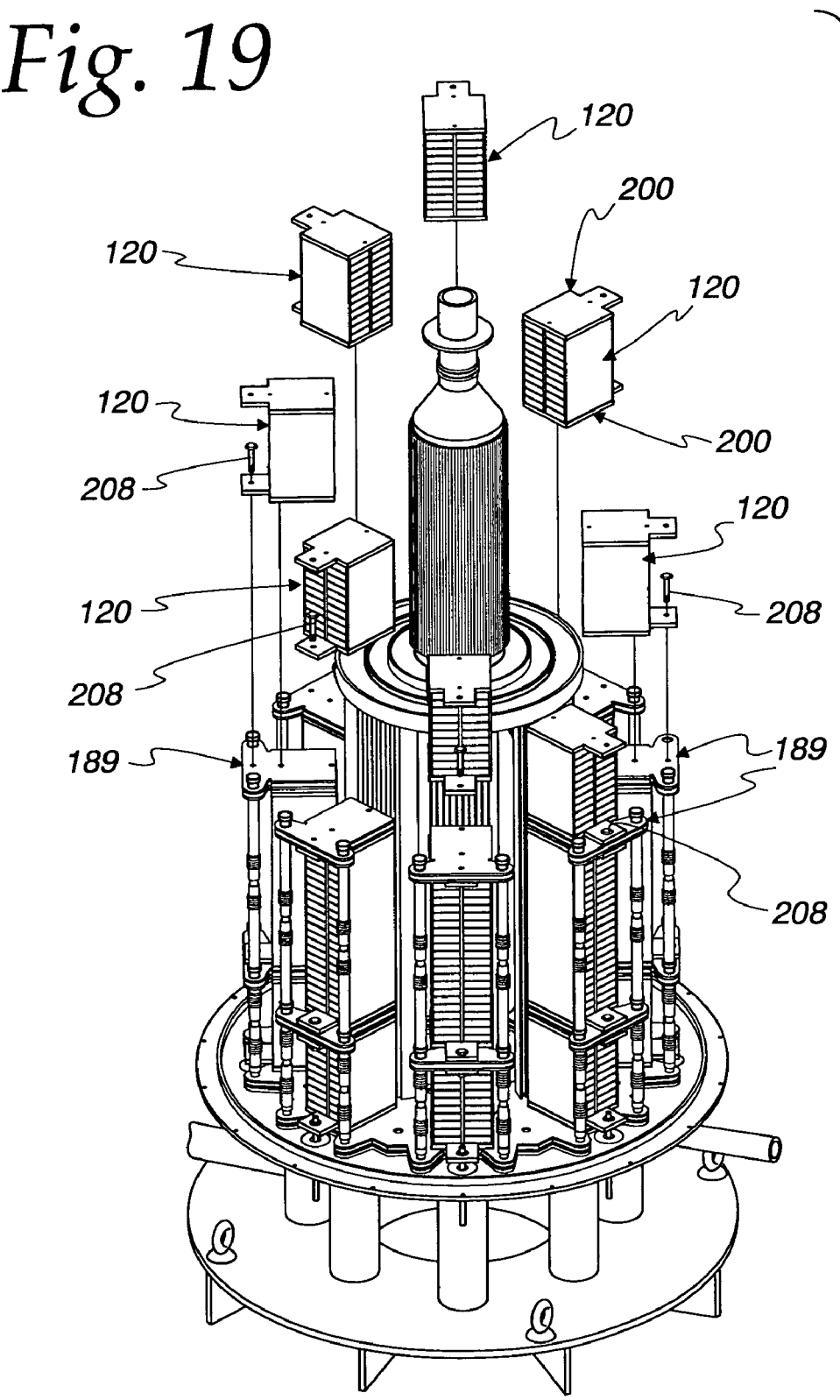
Figure 23:
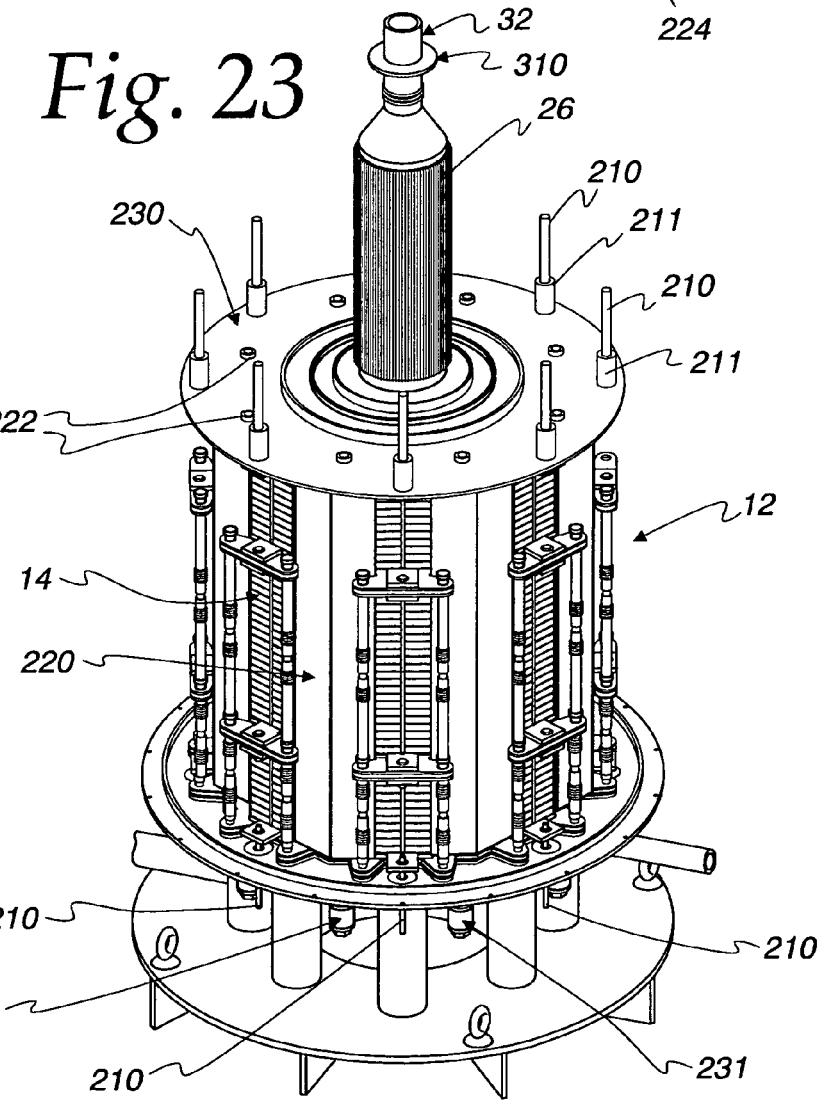
FIG. 23 is a perspective view showing the components of FIG. 22 in their assembled state.

As best seen in FIG. 23, bolt-like threaded electrodes 210 are provided through the openings 203 of the lowermost and uppermost collector plates 200 in order to provide bus connections for each of the stacks 14, with the upper electrodes 210 being surrounded by a can-shaped electrode sleeve 211 that shields the upper electrodes 210 from the cathode feed 44 and combined exhaust 62 in the passages 48 and 70. As will be explained in more detail below, the sleeve 211 also provides a seal surface for retaining the various flows of the unit 10 and allows for the electrode 210 to be electrically isolated from the various housing components of the unit 10. As best seen in FIG. 15, a layer of electrical insulation 212 is sandwiched between each of the lowermost collector plates 200 and the pressure plate/manifold 90 to electrically isolate the manifold 90 from the stacks 14.

Figure 21:
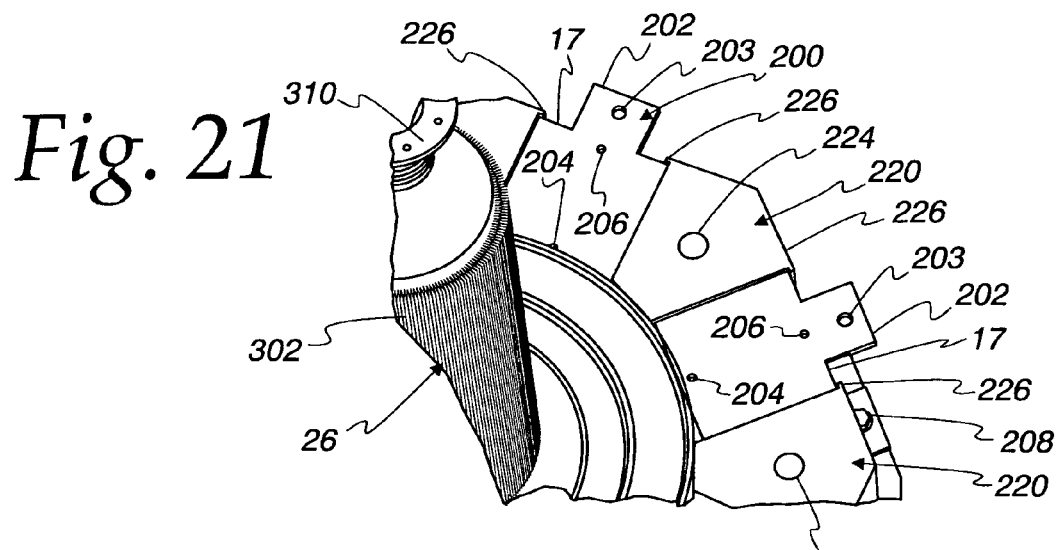
FIG. 21 is an enlarged, broken perspective view showing the components of FIG. 20 in their assembled state.
Figure 22:
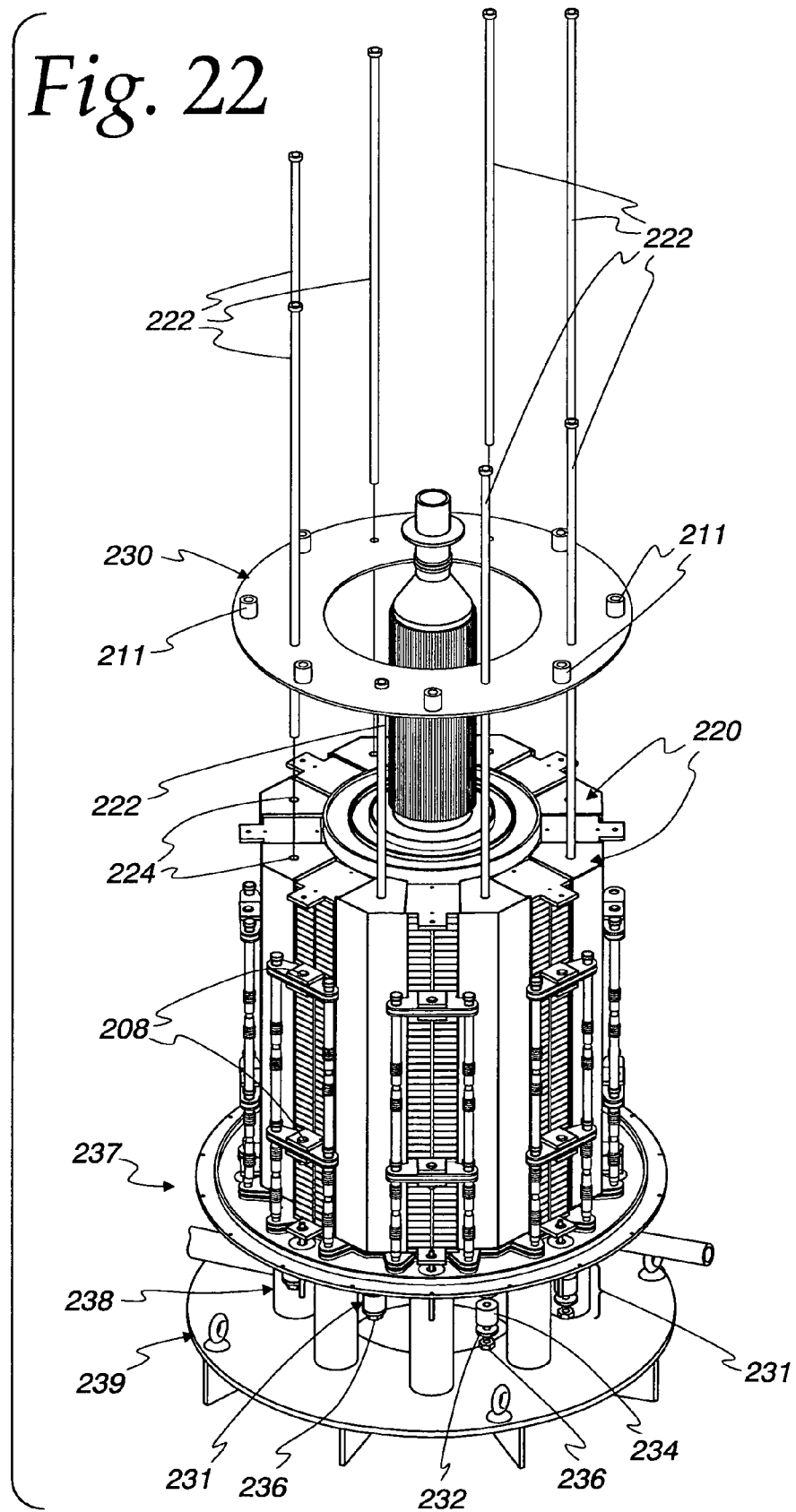
FIG. 22 is an exploded perspective view showing the assembled components of FIG. 20 together with an upper pressure plate and a plurality of tie rods.

With references to FIGS. 20-22, it can be seen that wedge-shaped spacers/flow baffles 220 are provided between adjacent pairs of the stacks 14. The baffles 220 serve to direct the cathode feed 44 into the cathode flow paths 128 and to fill the space between adjacent stacks so that the cathode feed 44 passes through each of the stacks 14, rather than bypassing around the longitudinal sides of the stacks 14. As seen in FIG. 22, the baffles 220 are held in place by tie rods 222 that pass through closely fitting bores 224 centrally located in each of the baffles 220. Preferably, the baffles 220 are electrically non-conductive and made as one unitary piece from a suitable ceramic material. While a unitary construction is preferred for the baffles 220, it may be desirable in some applications to provide the baffles as a multi-piece construction wherein only those parts of the baffle that contact the stacks 14 need to be electrically non-conductive. As best seen in FIG. 21, while optional, it is preferred that each of the baffles 220 includes a pair of longitudinal lips or wings 226 that extend slightly over the radially outer face 17 of the stacks 14 in order to further restrict the bypassing of the cathode feed 44 around the longitudinal sides of the stacks 14. In this regard, it should be appreciated that thermal growth in the circumferential direction will tend to decrease the sealing effect of the baffles 220 against the longitudinal sides of the stacks 14 because of the greater thermal growth of the metallic pressure plates between which the stacks 14 are sandwiched in comparison to the thermal growth of the stacks and baffles in the circumferential direction. The wings 226 help to prevent bypassing of the cathode flow that could otherwise be the result of such thermal growth.

With reference to FIG. 22, the stacks 14 are compressed between the integrated pressure plate/manifold 90 and an upper pressure plate 230 by passing the rods 222 through the pressure plate 230 and engaging the bottom side of the pressure plate 90 via a compression spring assembly 231 including an upper and lower pair of washers 232 that sandwich a compression spring (or a stack of die springs) 234 and are loaded by a threaded nut 236 engaging the threads on the end of the tie rod 220 to provide the compression force through the stacks 14. The compression spring assemblies 231 allow for thermal growth differential of the metallic tie rods 220 with respect to the largely ceramic stacks 14 during operation. The compression also helps to minimize the area specific electrical resistance in each of the stacks 14, and helps to maintain the seals that are formed between the interfacing plates of the stacks 14 for the cathode and anode gas flows. It should be noted that the illustrated embodiment of the unit 10 also includes a bolt flange/mount plate assembly 237 between the spring assemblies 231 and the pressure plate 90 to provide interfacing structure 238 for a supporting base 239 of the unit 10 and serve as the bottom cover for the housing 28 of the unit 10. The assembly 237 is spaced off of the pressure plate 90 to form the exhaust flow passage 66. Although not shown, electrical insulating layers of a suitable material are located between the pressure plate 230 and the stacks 12 in order to electrically isolate the stacks 12 from the pressure plates 90 and 230 and the rest of the compression components.

Figure 5:
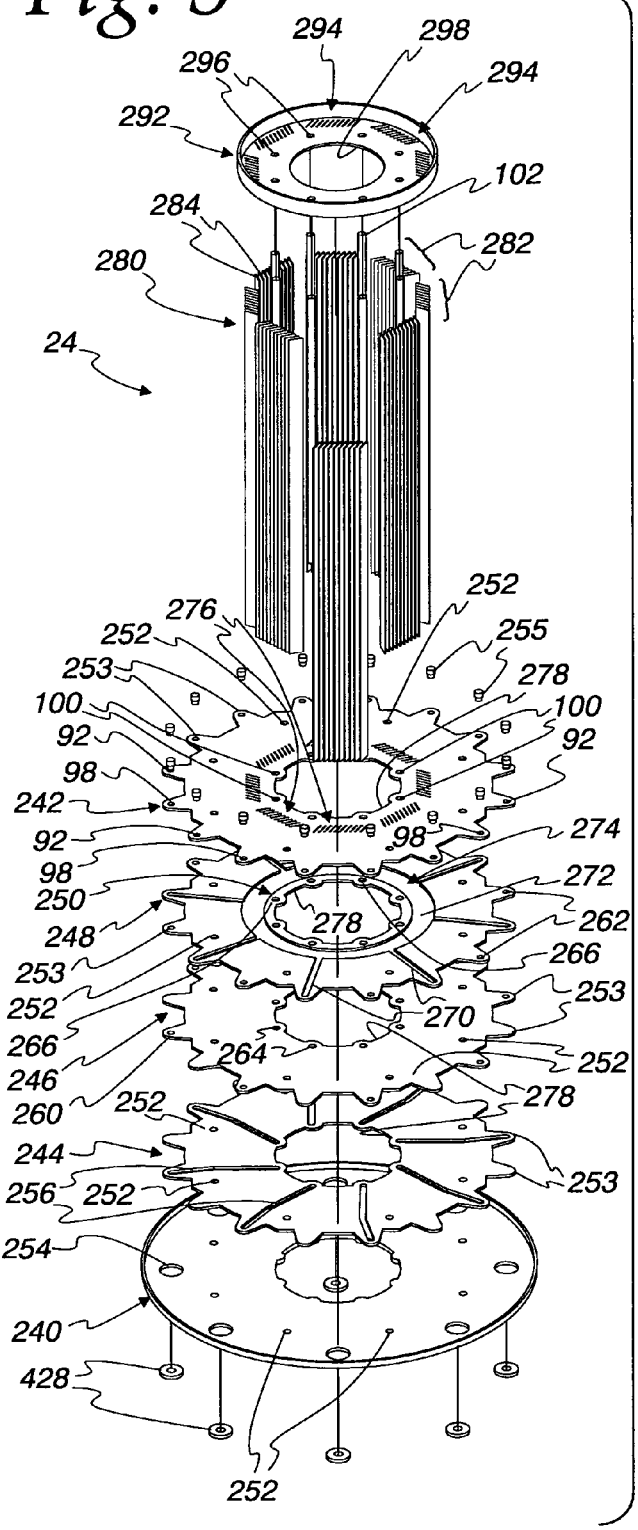
FIG. 5 is an exploded perspective view showing an integrated pressure plate/anode feed manifold and an array of fuel reformer tubes together with other selected components of the integrated unit of FIG. 1.

Referring back to FIG. 5, it can be seen that the pressure plate/manifold assembly 90 includes a pair of cover plates 240 and 242 that sandwich a plurality of intermediate plates 244, 246, 248 and 250. The plates 240, 242, 244, 246 and 248 all include eight equally spaced, tie rod through holes 252 that align with the holes 252 in the other plates to allow passage of the tie rods 222 through the manifold 90. The plates 242, 244, 246 and 248 each also include sixteen equally spaced somewhat triangular-shaped tabs 253 extending from their peripheries and in alignment with the corresponding tabs 253 on the other plates. Additionally, the plate 240 includes eight equally spaced openings 254 that allow the electrodes 210 to pass through the plate 240. The upper cover plate 242 includes the ports 92 and 98 for the anode feed and exhaust respectively, as well as the eight ports 100 for the directing the anode exhaust 96 to the eight tubes 102. Fluid connectors 255 similar to the connectors 170,172 are provided for each of the ports 92 and 98. The intermediate plate 244 includes eight anode exhaust slots 256 for directing the anode exhaust 96 from the eight ports 98 to the eight ports 100. Eight openings 260 and 262 are provided in the plates 246 and 248, respectively, and are aligned with the eight ports 98 and one end of the eight slots 256 in order to direct the anode exhaust 96 from the port 98 into the slot 256. Eight openings 264 and 266 are provided in the plates 246 and 250, respectively, are aligned with an opposite end of the slots 256 in the plate 244 and with the ports 100 in the plate 242 in order to direct the anode exhaust 96 from the slots 256 into the ports 100. The plate 248 includes eight radially directed anode feed slots 270 that are connected into a central opening 272 of the plate 248 that forms an annular plenum 274 with an outer perimeter of the plate 250. The eight ports 92 of the plate 242 are aligned with one end of the eight slots 270 in order to receive the anode feed 80 therefrom. Eight sets of reformer tube receiving slots 276 (only two sets of the slots 270 are shown in FIG. 5) are provided in the plate 242 so as to overlie the annular plenum 274 formed between the plates 248 and 250 in order to direct the anode feed 80 from the reformer 24 into the annular plenum 274 for supplying the slots 270. Aligned central openings 278 having conforming inner perimeters are provided in the plates 240, 242, 244, 246 and 250 in order to allow passage of other components of the unit 10 through the assembly 90 and to define the central opening 64 previously described in connection with the flow of the cathode exhaust 62. It should be appreciated that the features of intermediate plates 244, 246, 248 and 250 could alternatively be provided in a single machined plate of thickness equal to the total thickness of plates 246, 248 and 250.

Figure 3B:
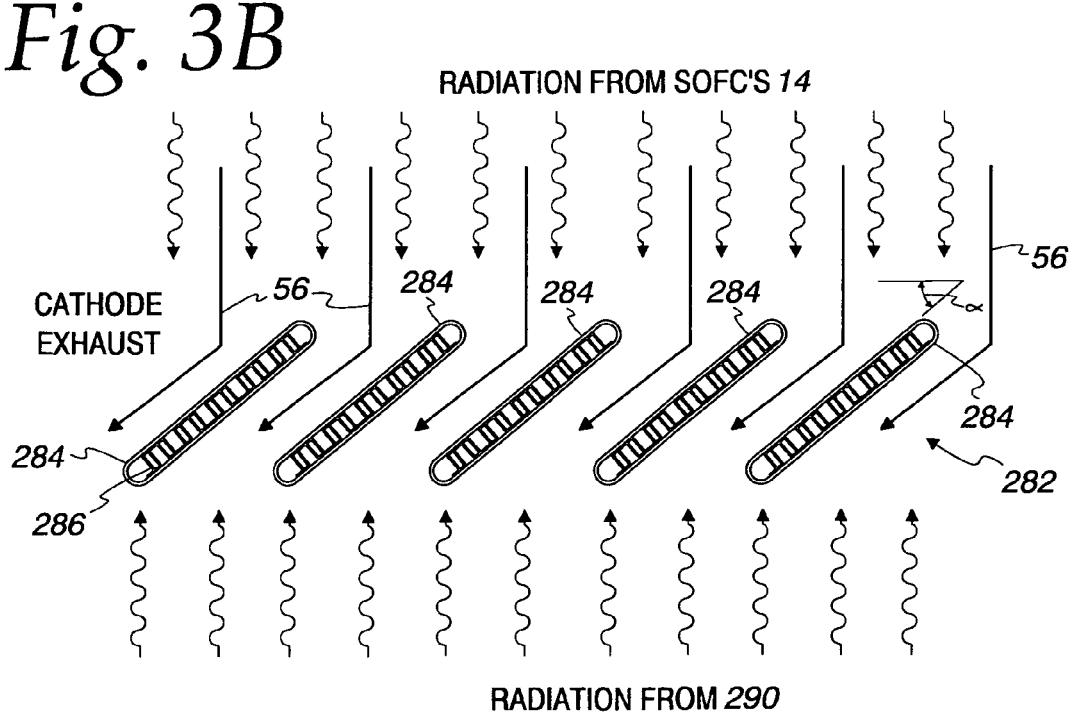
FIG. 3B is an enlarged, somewhat schematic view taken from line 3B-3B in FIG. 3A.

With reference to FIGS. 3A, 3B and to FIG. 5, the reformer 24 is provided in the form of an annular array 280 of eight tube sets 282, with each tube set 282 corresponding to one of the fuel cell stacks 14 and including a row of flattened tubes 284. In this regard, it should be noted that the number of tubes 284 in the tube sets 282 will be highly dependent upon the particular parameters of each application and can vary from unit 10 to unit 10 depending upon those particular parameters. Thus, FIGS. 3A and 3B illustrate five of the tubes 284 for each of the tube sets 282, whereas FIG. 5 illustrates ten of the tubes 284 for each of the tube sets 282.

Preferably, the reformer is a steam methane reformer ("SMR"). Steam methane reforming is a well-known process is which methane (i.e. natural gas) is reacted with steam over a catalyst to produce hydrogen. The steam reforming process consists of two separate reactions which occur within the same reactor—an oxygenolysis reaction (typically referred to as the steam reforming reaction) and an associated water-gas shift reaction. The oxygenolysis reaction produces hydrogen and carbon monoxide as follows:

$$CH_4 + H_2O \rightarrow 3H_2 + CO$$

This reaction is highly endothermic, requiring 206 kJ of energy per mole of methane consumed. Some of the CO produced is converted to $CO_2$ via the associated water-gas shift reaction:

$$CO + H_2O \rightarrow CO_2 + H_2$$

This reaction is moderately exothermic, and liberates 41 kJ of energy per mole of CO consumed. Steam reforming of methane for fuel cells is typically carried out over a precious metal catalyst at temperatures in the range of 700° C.-900° C. Since the overall reaction is endothermic, heat must be supplied to the reactor. It is advantageous from a system efficiency standpoint to utilize the heat produced by the solid oxide fuel cells 222 as the heat source for the reformer.

The steam methane reforming takes place as the anode feed 80 passes through the interior of the tubes 284 and comes in contact with a suitable catalyst (typically a precious metal catalyst) contained within the tubes 284. In this regard, as best seen in FIGS. 3B and 12, catalyst coated inserts 286, such as serpentine fins or lanced and offset fins, can be placed inside each of the tubes 284 to increase the catalyst surface area for the anode feed 80. While the inserts 286 can be brazed inside of the tubes 284, in the illustrated embodiment the inserts 286 are placed into the tubes 284 after brazing, as shown in FIG. 11. In this regard, although not shown, an insert support ring can be placed within the annular plenum 274 of the manifold assembly 90 if required to support the particular structure of the insert 286.

As best seen in FIGS. 3A and 3B, the tubes 284 in each of the sets 282 are preferably arranged relative to the exit face 18 of the corresponding fuel cell stack 14 to ensure that the majority of the radiant heat energy from the fuel cell stack 14 cannot pass through the tube set 282 without impinging on one of the broad sides of the tubes 284. To this end, the tubes 284 in each set 282 are arranged relative to the corresponding fuel cell stack 14 to ensure that radiant heat energy radiating normal to the face 18 cannot pass through the tube set 282 without impinging on one of the broad sides of the tubes 284, as best seen in FIG. 3B. To state this in other terms, the tubes 284 are arranged so that there is no direct "line-of-sight" normal to the face 18 through the tube set 282 from the perspective of the face 18 of the corresponding fuel cell stack 14. It should be appreciated that the particular angle α selected for the tubes 284 in each tube set 282 will depend upon the tube-to-tube spacing as well as the major dimension of each of the tubes 284. This arrangement of the tubes 284 helps to maximize the heating of the reformer 24, which is also heated by the cathode exhaust 56 as it passes over the exterior of the tubes 284. It should also be noted that the tubes 284 of the reformer also receive radiant heat energy from the cylindrical wall 290 that defines the flow passage 60 for the anode combustion gas 40 that flows into the manifold area 58. In this regard, it should be appreciated that the tubes are also arranged relative to the wall 290 to ensure that radiant heat energy radiating normal to the surface of the wall 290 at any point cannot pass through the corresponding set of tubes 282 without impinging on one of the broad sides of the tubes 282.

Figure 6:
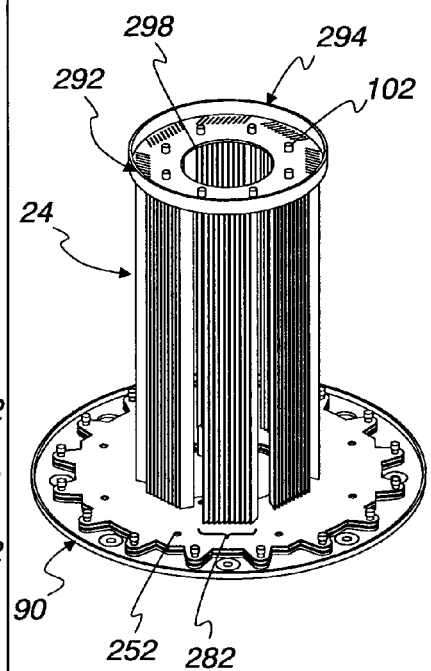
FIG. 6 is a perspective view showing the components of FIG. 5 in their assembled state.

A plenum or manifold plate 292 is provided to distribute the anode feed 80 to the interiors of the tubes 284 and includes a plurality of tube receiving slots 294 having an arrangement (like that of the slots 276) that corresponds to the ends of the tubes 284 in the array 280 so as to receive the ends of the tubes 284 in a sealed relation when brazed or otherwise bonded to the tubes 284 (again as with the slots 276). The manifold plate 292 also includes eight equally spaced, through holes 296 which receive ends of the eight anode exhaust tubes 102 and are sealed/bonded thereto. A central opening 298 is provided in the plate 292 to receive other components of the unit 10. As shown in FIG. 6, the above-described components of the pressure plate/manifold assembly 90 and the reformer 24 preferably are assembled and brazed as a single subassembly.

FIG. 7 is intended as a generic figure to illustrate certain construction details common to the cathode recuperator 20, the anode recuperator 22, and the anode cooler 26. The construction of each of these three heat exchangers basically consists of three concentric cylindrical walls A,B,C that define two separate flow passages D and E, with corrugated or serpentine fin structures G and H provided in the flow passages D and E, respectively, to provide surface area augmentation of the respective flow passages. Because the heat transfer occurs through the cylindrical wall B, it is preferred that the fins G and H be bonded to the wall B in order to provide good thermal conductivity, such as by brazing. On the other hand, for purposes of assembly and/or allowing differential thermal expansion, it is preferred that the fins G and H not be bonded to the cylindrical walls A and C. For each of the heat exchangers 20, 22 and 26, it should be understood that the longitudinal length and the specific geometry of the fins G and H in each of the flow paths D and E can be adjusted as required for each particular application in order to achieve the desired output temperatures and allowable pressure drops from the heat exchangers.

Turning now to FIGS. 8-10, the anode cooler 26 includes a corrugated or serpentine fin structure 300 to provide surface area augmentation for the anode exhaust 96 in the passage 112, a corrugated or serpentine fin structure 302 that provides surface area augmentation for the cathode feed flow 44 in the passage 46, and a cylindrical wall or tube 304 to which the fins 300 and 302 are bonded, preferably by brazing, and which serves to separate the flow passage 46 from the flow passage 112. As best seen in FIG. 9, a cylindrical flow baffle 306 is provided on the interior side of the corrugated fin 300 and includes the dome-shaped baffle 114 on its end in order to define the inner part of flow passage 112. A donut-shaped flow baffle 308 is also provided to direct the cathode feed 44 radially outward after it exists the flow passage 46. The cone-shaped baffle 116 together with the port 32 are attached to the top of the tube 304, and include a bolt flange 310 that is structurally fixed, by a suitable bonding method such as brazing or welding, to the port 32, which also includes a bellows 311 to allow for thermal expansion between the housing 28 and the components connected through the flange 310. As seen in FIG. 10, the above-described components can be assembled as yet another subassembly that is bonded together, such as by brazing.

In reference to FIGS. 1 and 11, it can be seen that the anode recuperator 22 includes a corrugated or serpentine fin structure 312 (best seen in FIG. 8) in the annular flow passage 82 for surface area augmentation for anode feed 80. As best seen in FIG. 1, the anode recuperator 22 further includes another corrugated or serpentine fin structure 314 in the annular flow passage 106 for surface augmentation of the anode exhaust 96. As best seen in FIG. 11, corrugated fins 312 and 314 are preferably bonded to a cylindrical wall of tube 316 that serves to separate the flow passages 82 and 106 from each other, with the dome-shaped baffle 110 being connected to the bottom end of the wall 316. Another cylindrical wall or tube 320 is provided radially inboard from the corrugated fin 314 (not shown in FIG. 11, but in a location equivalent to fin 300 in cylinder 304 as seen in FIG. 9) to define the inner side of the annular passage 106, as best seen in FIG. 11. As seen in FIG. 2A, an insulation sleeve 322 is provided within the cylindrical wall 320 and a cylindrical exhaust tube 324 is provided within the insulation sleeve 322 to define the passage 108 for the anode exhaust 96. Preferably, the exhaust tube 324 is joined to a conical-shaped flange 328 provided at a lower end of the cylindrical wall 320. With reference to FIG. 11, another cylindrical wall or tube 330 surrounds the corrugated fin 312 to define the radial outer limit of the flow passage 82 and is connected to the inlet port 30 by a conical-shaped baffle 332. A manifold disk 334 is provided at the upper end of the wall 316 and includes a central opening 336 for receiving the cylindrical wall 320, and eight anode exhaust tube receiving holes 338 for sealingly receiving the ends of the anode exhaust tubes 102, with the plate 308 serving to close the upper extent of the manifold plate 334 in the assembled state. As seen in FIG. 12, the previously described components of the anode cooler 26 and the anode recuperator 22 are inserted through a central opening 298 of the manifold plate 292 with the ends of the tubes 102 being received and sealingly bonded in the openings 338 and the top of the cylindrical wall 330 being sealingly bonded to the perimeter of the opening 298 to define the flow path for the anode feed 80 into the radial passage 84. A ring-shaped manifold plate 340 with flanges 342 and 344 at its inner and outer perimeter is provided to enclose the area defined by the manifold plate 292 and the plate 334 so as to define the manifold 86 for distributing the anode feed flow from the radial passage 84 to the interior of the tubes 284.

Figure 24:
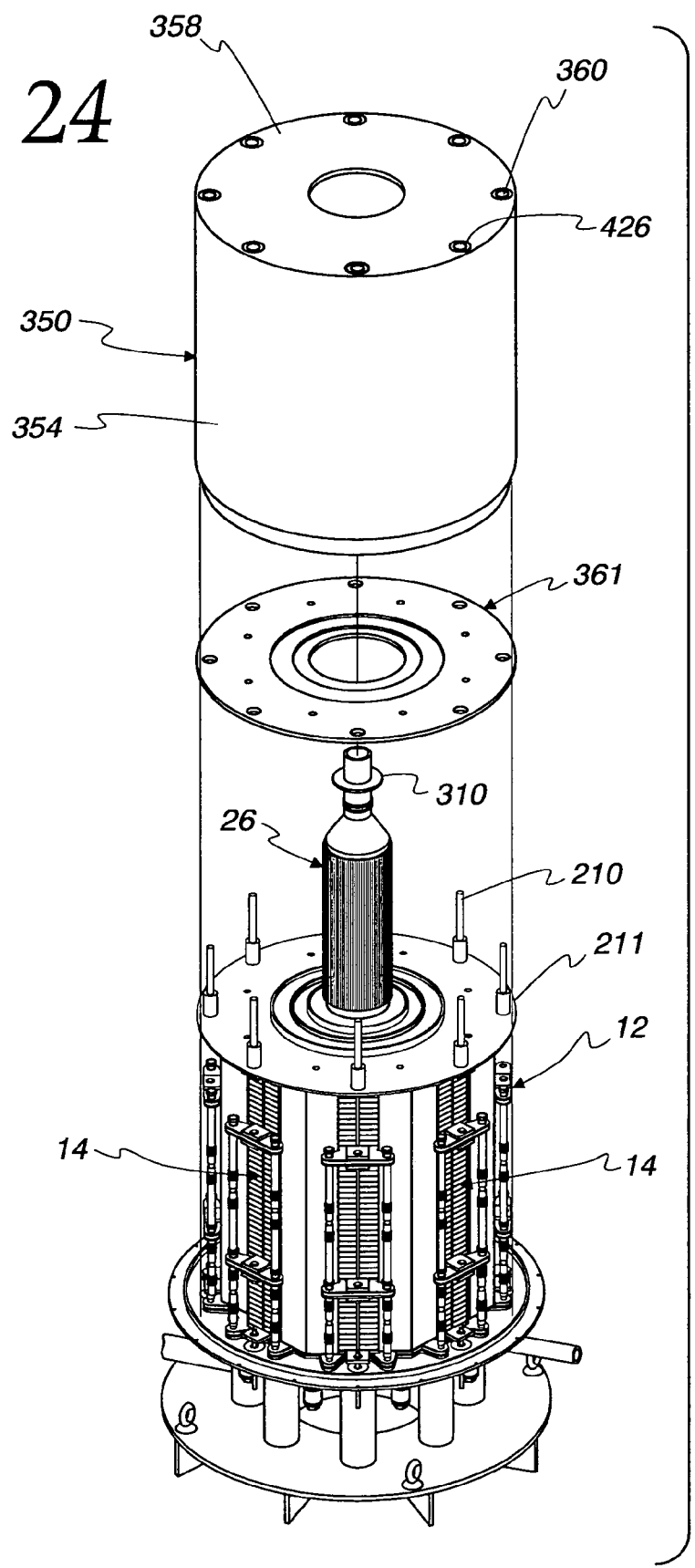
FIG. 24 is an exploded perspective view showing the components of FIG. 23 together with an insulation disk and heat shield housing of the integrated unit of FIG. 1.

With reference to FIGS. 2B and 24, a heat shield assembly 350 is shown and includes an inner cylindrical shell 352 (shown in FIG. 2B), an outer cylindrical shell 354, an insulation sleeve 356 (shown in FIG. 2B) positioned between the inner and outer shells 352 and 354, and a disk-shaped cover 358 closing an open end of the outer shell 350. The cover 358 includes eight electrode clearance openings 360 for through passage of the electrode sleeves 211. As seen in FIG. 24, the heat shield assembly 350 is assembled over an insulation disk 361 the outer perimeter of the assembled array 12 of fuel cells 14 and defines the outer extent of the cathode feed manifold 52. The heat shield 350 serves to retain the heat associated with the components that it surrounds.

Figure 26:
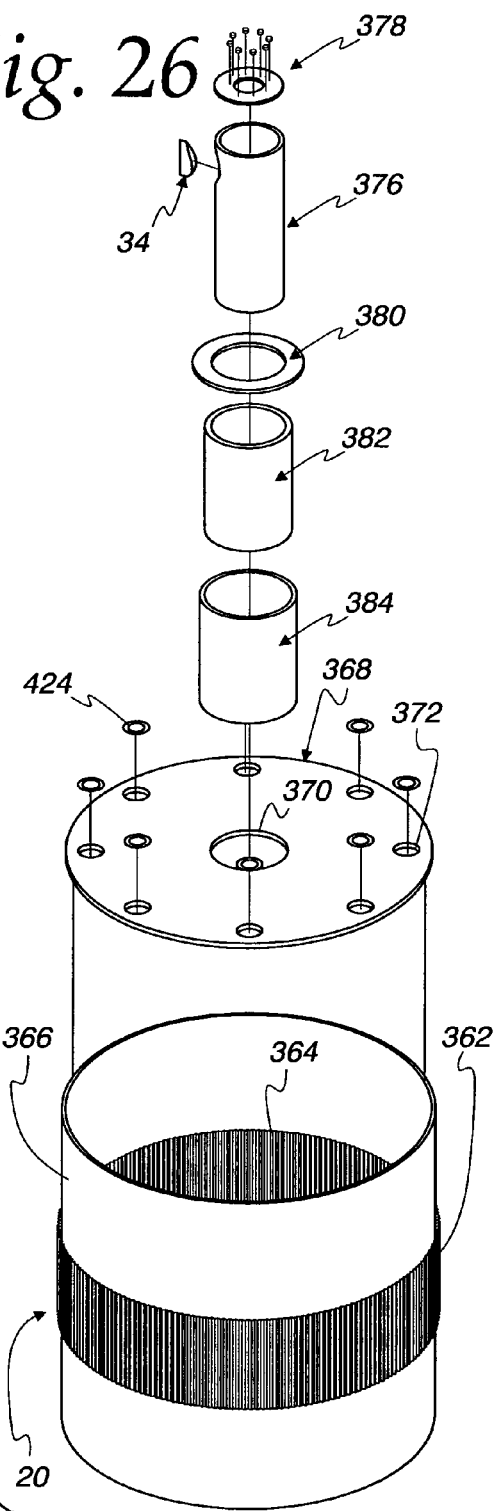
FIG. 26 is an exploded perspective view showing a cathode recuperator assembly together with other components of the integrated unit of FIG. 1.

With reference to FIG. 1 and FIG. 26, the cathode recuperator 20 includes a corrugated or serpentine fin structure 362 to provide surface enhancement in the annular flow passage 68 for the combined exhaust 62, a corrugated or serpentine fin structure 364 to provide surface enhancement in the annular flow passage 50 for the cathode feed 44, and a cylindrical tube or wall 366 that separates the flow passages 50 and 68 and to which the fins 362 364 are bonded. A disk-shaped cover plate 368 is provided to close the upper opening of the cylindrical wall 366 and includes a central opening 370, and a plurality of electrode clearance openings 372 for the passage of the electrode sleeve 211 therethrough. A cylindrical tube or sleeve 376 is attached to the cover 368 to act as an outer sleeve for the anode cooler 26, and an upper annular bolt flange 378 is attached to the top of the sleeve 376. A lower ring-shaped bolt flange 380 and an insulation sleeve 382 are fitted to the exterior of the sleeve 376, and a cylindrical wall or shield 384 surrounds the insulation sleeve 382 and defines an inner wall for the passage 72, as best seen in FIGS. 1 and 26.

Figure 25:
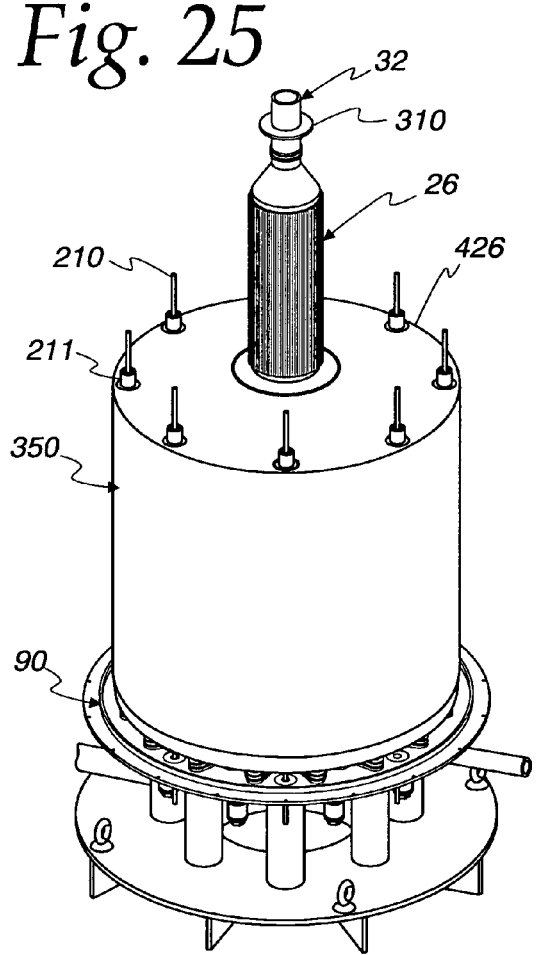
FIG. 25 is a perspective view showing the assembled state of the components of FIG. 24.

With reference to FIG. 27, the components of FIG. 26 are then assembled over the components shown in FIG. 25 with the flange 378 being bolted to the flange 310.

With reference to FIG. 28, the outer housing 28 is assembled over the remainder of the unit 10 and bolted thereto at flange 380 and a flange 400 of the housing 28, and at flange 402 of the assembly 237 and a flange 404 of the housing 28, preferably with a suitable gasket between the flange connections to seal the connections.

Figure 29:
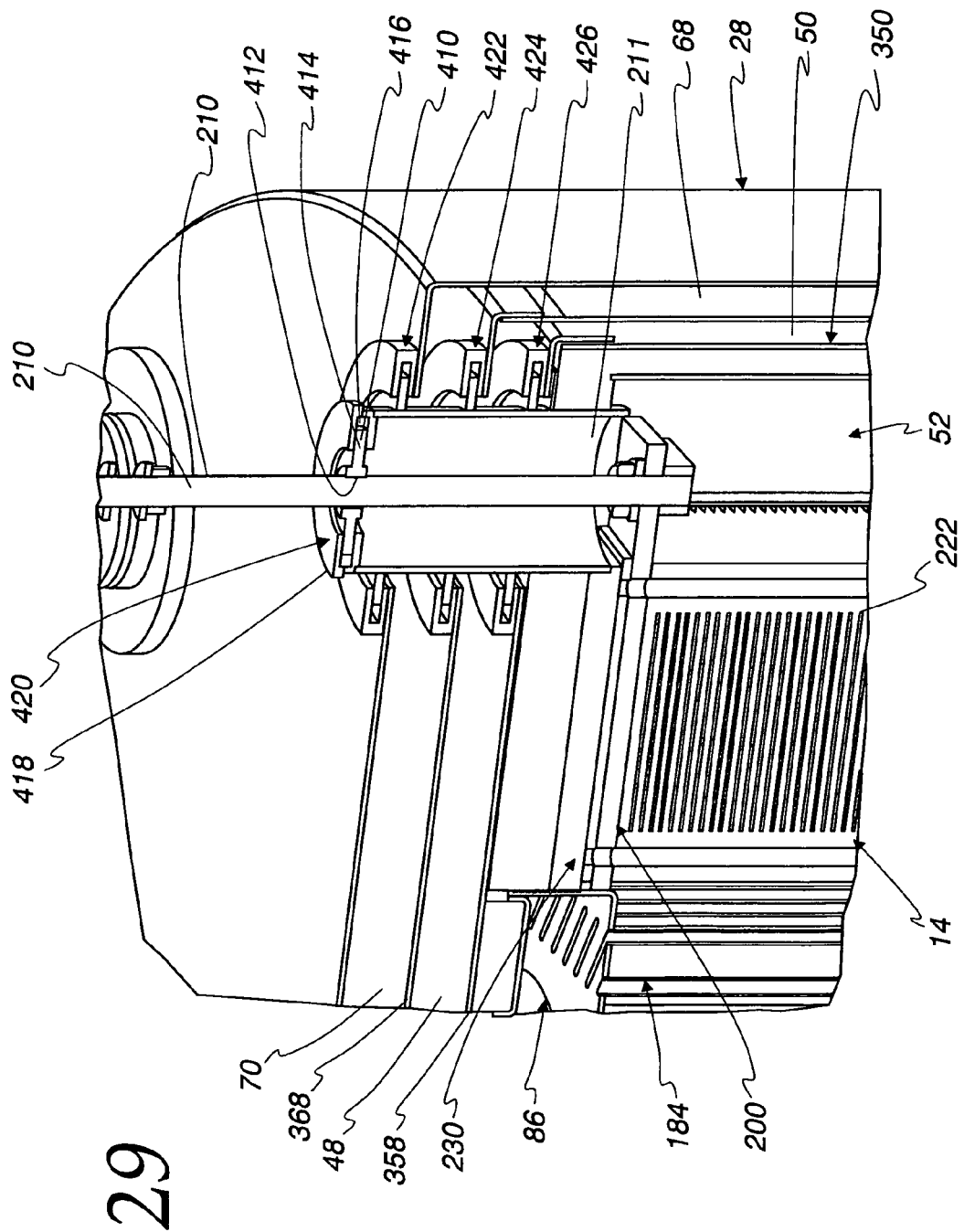
FIG. 29 is an enlarged, partial perspective section view showing selected components of the unit of FIG. 1.

With reference to FIG. 29, the assembly details associated with the upper electrodes 210 and the electrode sleeves 211 will be described in more detail. Differential thermal expansion both in the radial direction relative to the central axis 16 and in the longitudinal direction relative to the central axis 16 present one challenge with respect to the upper and lower electrodes 210 which must extend outside of the housing 28 while preventing or allowing only a limited amount of leakage of the cathode flow. As illustrated in FIG. 29, the preferred embodiment of the unit 10 addresses this problem by providing slip rings that fit in two piece retainer structures. More specifically, a slip ring 410 having a central bore 412 is assembled to the electrode 210 with a close fit between the exterior of the electrode 210 and the bore 412 in order to restrict or prevent leakage while allowing relative movement between the slip ring 410 and the electrode 210 in the longitudinal direction. The outer perimeter 414 of the slip ring 410 is received in an annular slot 416 of a two piece retainer structure 418 that forms the upper part of the electrode sleeve 211. The outer perimeter has a tight fit in the slot 416 so as to prevent or restrict leakage while allowing for relative movement between the ring 410 and the retainer 418 in the radial direction, which in turn allows relative radial movement between the electrode 210 and the housing 28. Together, the slip ring 410 and the retainer 418 form a seal/slip ring assembly 418. Similar seal/slip ring assemblies 422, 424 and 426 are provided for the interface between the electrode sleeve 211 and the housing 28, the cover plate 368, and the heat shield 358, respectively. Similar seal slip ring assemblies 428 are shown in FIG. 5 for use with eight lower electrodes 210.

Figure 31:
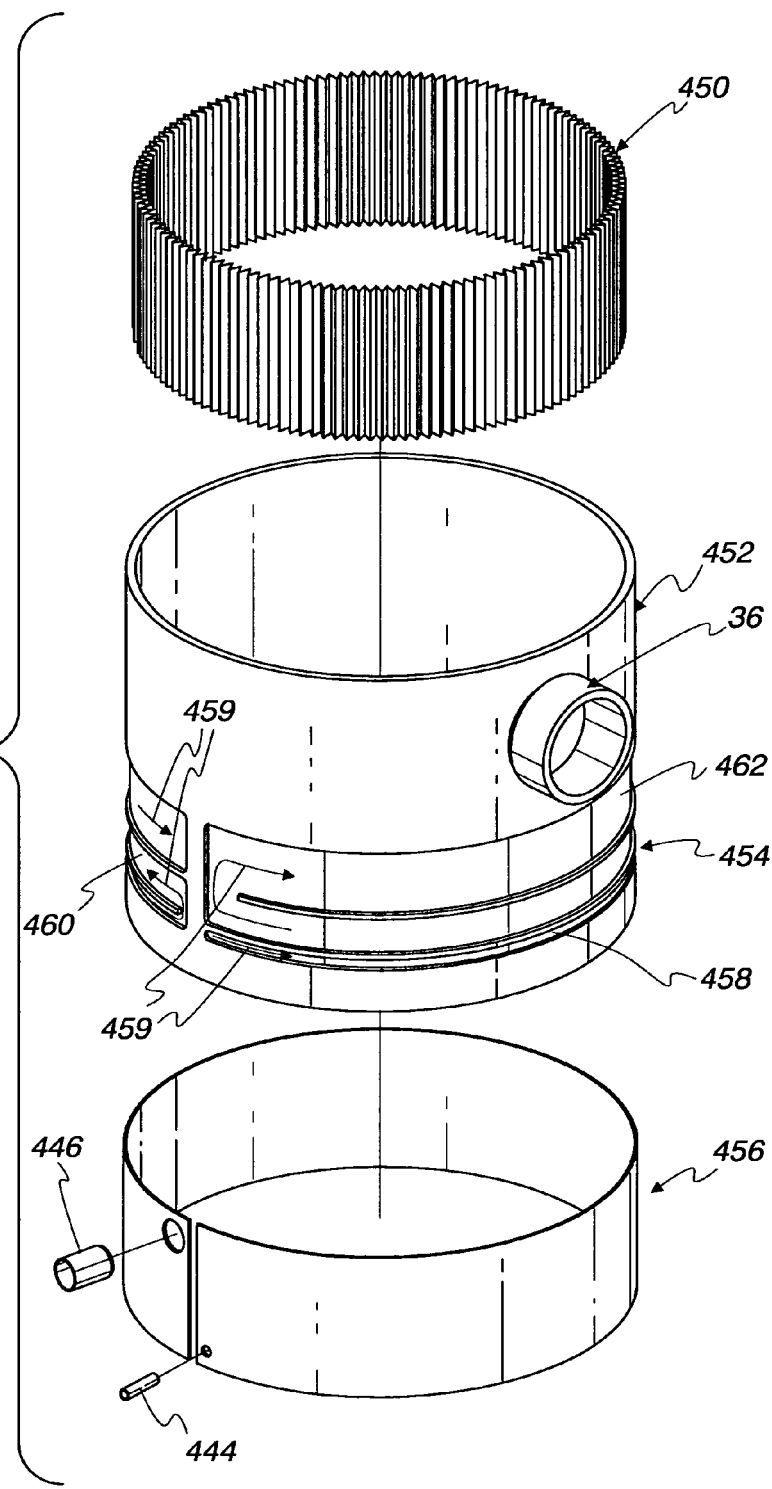
FIG. 31 is an exploded perspective view of a steam generator utilized in the integrated unit of FIG. 30.
Figure 32:
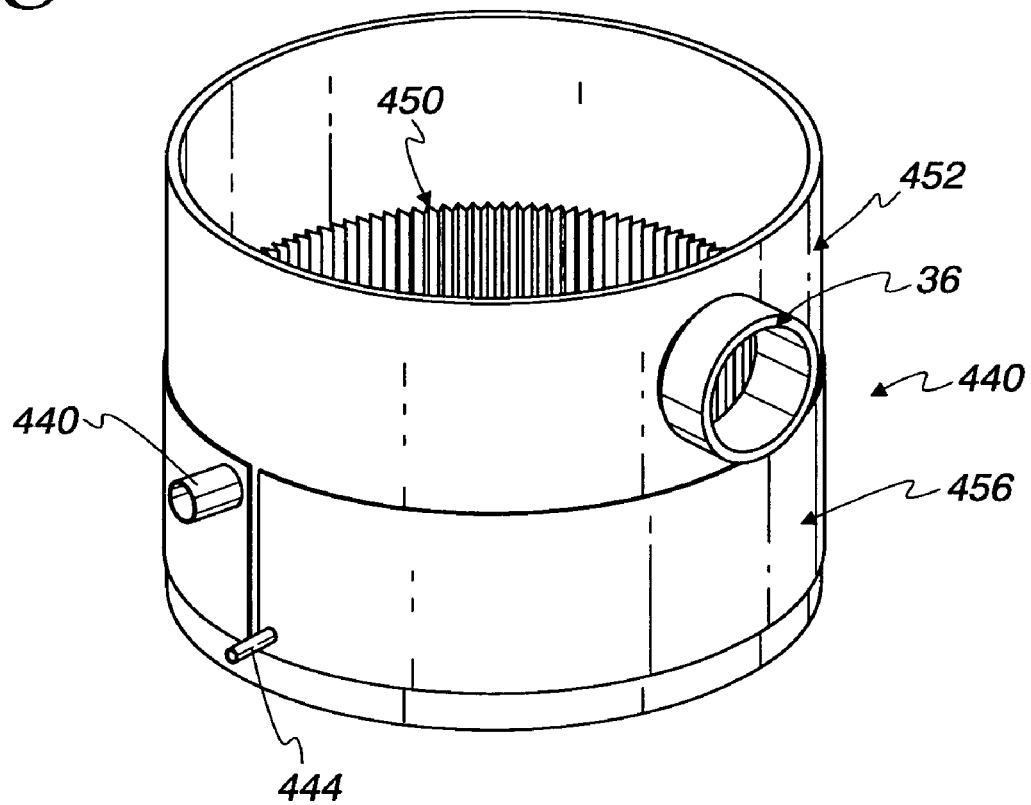
FIG. 32 is a perspective view of the steam generator of FIG. 31.

It should be appreciated that while the integrated unit 10 has been shown to include the cathode recuperator 20, the anode recuperator 22, the reformer 24, and the anode exhaust cooler 26, in some applications it may be desirable to eliminate one or more of these components from the integrated unit 10. Conversely, it may be desirable in some applications to add other components to the integrated unit 10. For example, with reference to FIG. 30, an alternate preferred embodiment of the unit 10 is shown and differs from the previously described embodiment primarily in that a steam generator (water/combined exhaust heat exchanger) 440 has been added in order to utilize waste heat from the combined exhaust 62 to produce steam during startup. In this regard, a water flow 442 is provided to a water inlet port 444 of the heat exchanger 440, and a steam outlet port 446 directs a steam flow 448 to be mixed with the anode feed 80 for delivery to the anode feed inlet port 30. With reference to FIG. 31, the heat exchanger 440 includes a cathode exhaust fin 450; an annular housing 452 having a circumferentially extending, three pass water flow path 454 formed in an exterior side thereof; and a water passage seal ring 456 that is bonded, such as by brazing, to the exterior of the housing 452 surrounding the water flow path 454 so as to seal the same as best seen in FIG. 32. The water flow path 454 includes a first circumferentially extending pass 458 that extends around almost the entire circumference of the housing 452 to direct the water flow, shown by arrows 459, from the inlet 444 to a second circumferentially extending pass 460 of the flow path 454 which extends almost around the entire circumference of the housing 452 to direct the water flow 459 to a third circumferentially extending pass 462 of the flow path 454, which extends around almost the entire circumference of the housing 452 to deliver the water flow 456, now steam, to the outlet 446. It can be seen that each of the passes 458, 460 and 462 are formed so that they have a progressively larger flow area from pass to pass so as to accommodate the increased volume as the water changes from the liquid phase to the vapor phase. Preferably, the fin 450 is bonded, such as by brazing, to the interior surface of the housing 452 to increase the transfer of heat from the exhaust flow 62 to the water flow 459. While a preferred form has been disclosed herein for the steam generator 440, it should be understood that other forms and configurations may be desirable, depending upon the requirements and parameters of each specific application.

Figure 30:
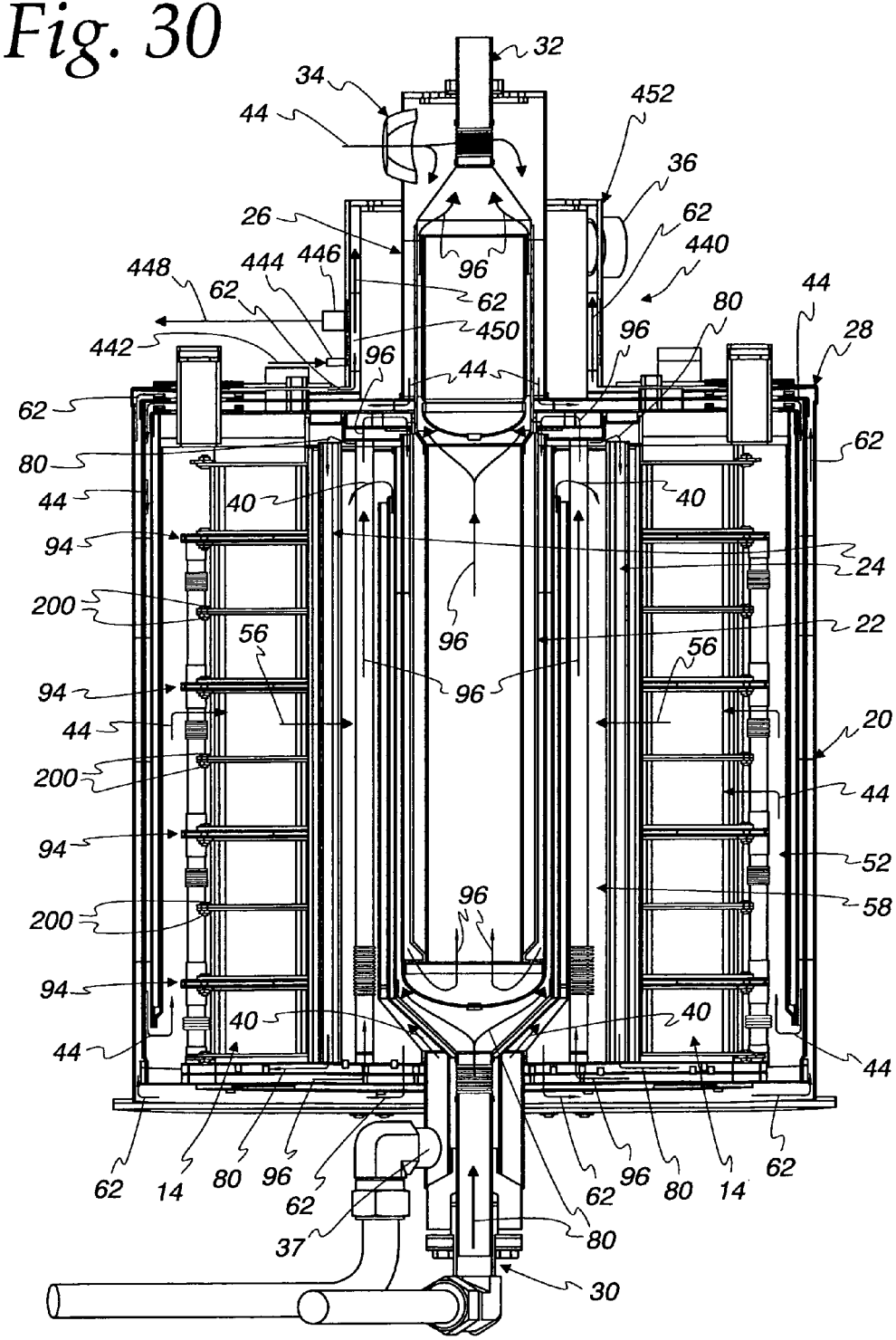
FIG. 30 is a view similar to FIG. 1, but showing a modified version of the integrated SOFC and fuel processor.

The unit 10 of FIG. 30 also differs from the previously described unit 10 shown in FIGS. 1-29 in that each stack 14 includes two additional anode feed/return assemblies 94 and three additional sets of the collector plates 200 that are not associated with any of the assemblies 94. These modifications illustrate that in some applications more (or less) of the assemblies 94 may be required to achieve an optimum distribution of the anode feed 80 to each of the stacks 14 and/or that additional assemblies 94 and collector plates 200 may be required in order to optimize the electrical output of each of the stacks 14.

Figure 33:
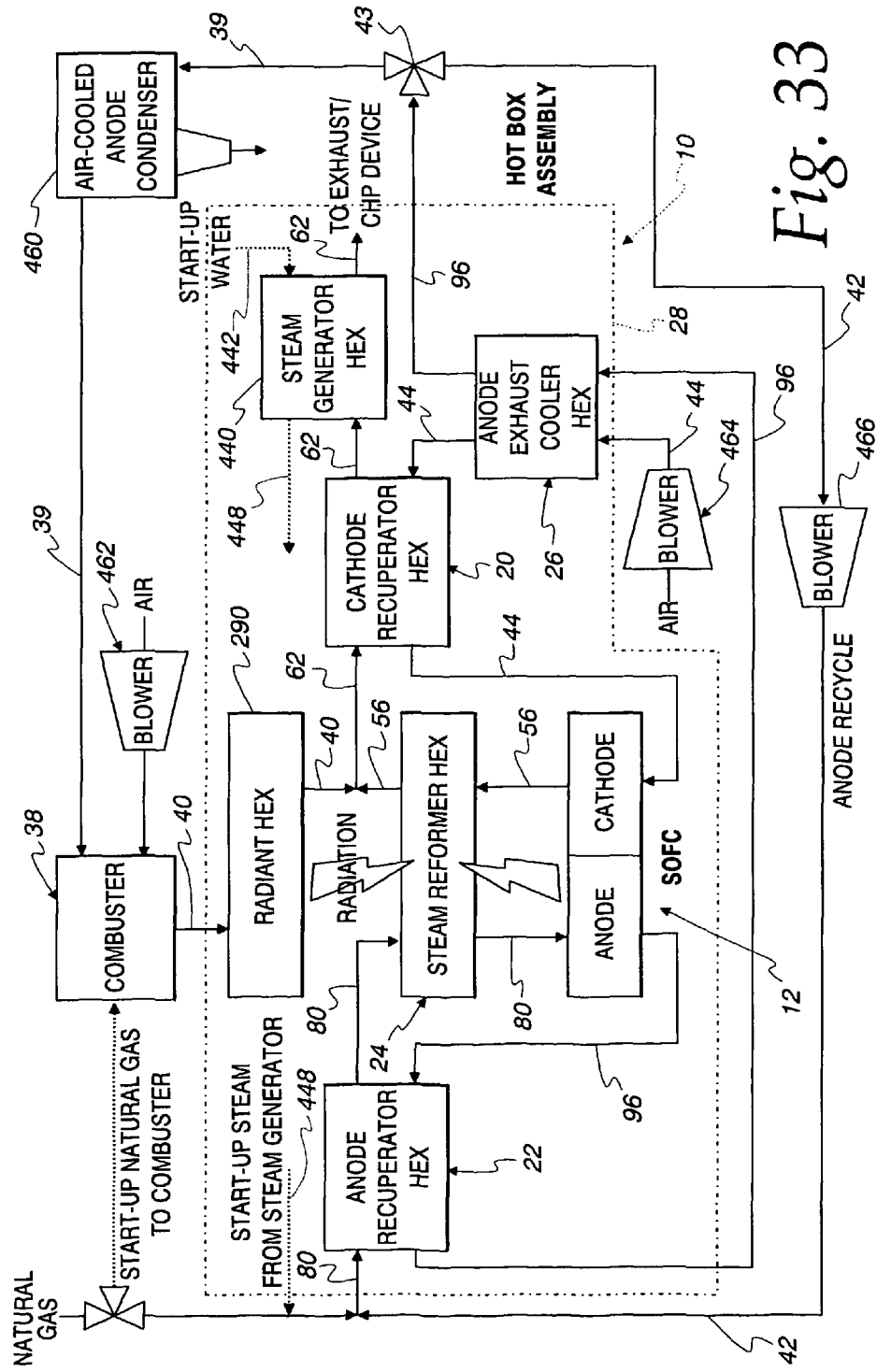
FIG. 33 is a schematic representation of the fuel cell units embodying the invention.

FIG. 33 is a schematic representation of the previously described integrated unit 10, including the preferred embodiment described in connection with FIGS. 30-32, and showing the various flows through the integrated unit 10 in relation to each of the major components of the integrated unit 10. FIG. 33 also shows an optional air cooled anode condenser 460 that is preferably used to cool the anode exhaust flow 39 and condense water therefrom prior to the flow 39 entering the combustor 38. FIG. 33 also shows a blower 462 for providing an air flow to the combustor 38, a blower 464 for providing the cathode feed 44, and a blower 466 for pressurizing the anode recycle flow 42.

It should be appreciated that while several heat exchanger subassemblies have been included in the integrated unit 10, many of the heat exchangers disclosed herein may prove desirable in other systems, or even as stand alone assemblies.

It should also be appreciated that by arranging the fuel cell stacks 14 into the array 12, the unit 10 can provide for a relatively compact structure that minimizes the leakage of the cathode flow that can sometimes by associated with planar SOFC's. In this regard, it should be noted that the annular arrangement of the fuel cell stacks 14 in combination with the baffles 220, eliminates the need for specialized structures to provide compression against the side walls of the fuel cell stacks such as is required in conventional planar SOFC configurations. It should also be appreciated that the integrated unit 10 provides for an efficient utilization of the heat that is generated within the unit 10.

The invention claimed is:

1. A fuel cell system comprising:
 a fuel cell; and
 a reformer connected to the fuel cell to direct an anode inlet gas flow thereto and arranged adjacent to the fuel cell to receive radiant heat energy therefrom, the reformer comprising a plurality of flattened tubes to direct the anode inlet gas through the fuel cell, wherein the tubes extend parallel to each other and are arranged in an annular array, the annular array being surrounded by the fuel cell.

2. The fuel cell system of claim 1 wherein the tubes are arranged in a plurality of rows, the tubes in each row arranged relative to a radiating face of the fuel cell to ensure that radiant heat energy radiating normal to the radiating face from the fuel cell cannot pass through the row of tubes without impinging on one of the tubes.

3. The fuel cell system of claim 1 wherein the fuel cell has a plurality of radiating faces and the tubes are arranged in a plurality of rows, the tubes in each row arranged relative to one of the radiating faces of the fuel cell to ensure that radiant heat energy radiating normal to the radiating face from the fuel cell cannot pass through the row of tubes without impinging on one of the tubes.

4. A fuel cell system comprising:
 a fuel cell;
 an anode exhaust gas combustor connected to the fuel cell to receive anode exhaust gas therefrom;
 a combusted anode exhaust gas flow path connected to the anode exhaust gas combustor to receive combusted anode exhaust gas therefrom and including an extended surface heated by the combusted anode exhaust gas flow; and
 a reformer connected to the fuel cell to direct an anode inlet gas flow thereto and arranged adjacent the extended surface to receive radiant energy therefrom;
 wherein the reformer comprises a plurality of flattened tubes to direct the anode inlet gas through the fuel cell.

5. The fuel cell system of claim 4 wherein the tubes extend parallel to each other and are arranged in an annular array.

6. The fuel cell system of claim 5 wherein the annular array surrounds the extended surface.

7. The fuel cell system of claim 4 wherein the tubes are arranged in a plurality of rows, the tubes in each row arranged relative to the extended surface to ensure that radiant heat energy radiating normal to the extended surface cannot pass through the row of tubes without impinging on one of the tubes.

8. The fuel cell system of claim 4 wherein the tubes are arranged relative to the extended surface to ensure that radiant heat energy radiating normal to the extended surface cannot pass through the row of tubes without impinging on one of the tubes.

9. The fuel cell system of claim 4 wherein the reformer is arranged adjacent the fuel cell to receive radiant heat energy therefrom.

10. The fuel cell system of claim 4 further comprising a cathode recuperator heat exchanger connected to receive a hot gas flow comprising the combusted anode exhaust gas.

* * * * *